United States Patent
Moore et al.

(10) Patent No.: US 11,288,917 B2
(45) Date of Patent: Mar. 29, 2022

(54) SYSTEMS AND METHODS FOR UTILIZING RFID TECHNOLOGY TO FACILITATE A GAMING SYSTEM

(71) Applicant: Walker Digital Table Systems, LLC, Las Vegas, NV (US)

(72) Inventors: Carolyn Moore, Las Vegas, NV (US); Surinder Singh, Henderson, NV (US); Brian Besterman, South Salem, NY (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 0 days.

(21) Appl. No.: 16/935,150

(22) Filed: Jul. 21, 2020

(65) Prior Publication Data
US 2020/0349797 A1 Nov. 5, 2020

Related U.S. Application Data

(60) Division of application No. 15/813,151, filed on Nov. 14, 2017, now Pat. No. 10,755,520, which is a
(Continued)

(51) Int. Cl.
*G07F 17/00* (2006.01)
*G07F 19/00* (2006.01)
(Continued)

(52) U.S. Cl.
CPC ............ *G07F 17/322* (2013.01); *A63F 1/067* (2013.01); *A63F 1/18* (2013.01); *A63F 3/00157* (2013.01);
(Continued)

(58) Field of Classification Search
CPC . G07F 17/311; G07F 17/3223; G07F 17/3288
See application file for complete search history.

(56) References Cited

U.S. PATENT DOCUMENTS

| 5,735,742 A | 4/1998 | French |
| 6,517,435 B2 | 2/2003 | Soltys et al. |

(Continued)

FOREIGN PATENT DOCUMENTS

| CA | 2543221 | 9/2015 |
| CN | 102039048 A | 5/2011 |

(Continued)

OTHER PUBLICATIONS

Written Opinion for Application No. PCT/US2016/032797 dated Aug. 30, 2016; 12 pps.
(Continued)

*Primary Examiner* — Milap Shah
(74) *Attorney, Agent, or Firm* — RowanTree Law Group, PLLC; Magdalena M. Fincham

(57) ABSTRACT

In accordance with some embodiments, an RFID-enabled table game system provides for determining whether there is a variance between an expected balance of inventory and an actual balance of inventory in a game element container. If a variance is detected, the RFID-enabled game system may identify at least one characteristic associated with an RFID-enabled game element that is determined to be a source of the variance (e.g., a player position at which the RFID-enabled game element had last been detected, a denomination or value of the game element, and/or an identifier associated with the game element). In some embodiments, an alert may be output to game provider personnel (e.g., a dealer of a card game) at the end of a game play when such a variance is detected, thus allowing the variance to be corrected in an efficient and timely manner.

10 Claims, 10 Drawing Sheets

Related U.S. Application Data continuation of application No. PCT/US2016/032797, filed on May 16, 2016.

(60) Provisional application No. 62/161,915, filed on May 15, 2015.

(51) Int. Cl.
*G07F 17/32* (2006.01)
*A63F 1/06* (2006.01)
*A63F 1/18* (2006.01)
*A63F 3/00* (2006.01)
*G06Q 20/32* (2012.01)
*G06Q 20/34* (2012.01)
*A63F 9/24* (2006.01)

(52) U.S. Cl.
CPC ....... *G06Q 20/3278* (2013.01); *G06Q 20/352* (2013.01); *G07F 17/3211* (2013.01); *G07F 17/3223* (2013.01); *G07F 17/3288* (2013.01); *A63F 2003/00164* (2013.01); *A63F 2009/2489* (2013.01)

(56) References Cited

U.S. PATENT DOCUMENTS

| | | |
|---|---|---|
| 6,533,662 B2 | 3/2003 | Soltys et al. |
| 6,579,180 B2 | 6/2003 | Soltys et al. |
| 10,750,552 B2 | 8/2020 | Witkowski et al. |
| 10,755,520 B2 * | 8/2020 | Moore ............... G07F 17/3211 |
| 2006/0019739 A1 | 1/2006 | Soltys et al. |
| 2006/0160600 A1 | 7/2006 | Hill |
| 2006/0160608 A1 | 7/2006 | Hill |
| 2007/0035399 A1 | 2/2007 | Hecht |
| 2007/0057469 A1 | 3/2007 | Grauzer |
| 2007/0060311 A1 | 3/2007 | Rowe |
| 2007/0060313 A1 | 3/2007 | Mathis et al. |
| 2008/0076529 A1 | 3/2008 | Richards |
| 2008/0113767 A1 | 5/2008 | Nguyen |
| 2009/0131151 A1 | 5/2009 | Harris et al. |
| 2009/0291762 A1 | 11/2009 | Walker |
| 2010/0093429 A1 | 4/2010 | Mattice |
| 2011/0089634 A1 | 4/2011 | Thornson et al. |
| 2011/0227703 A1 | 9/2011 | Kotab |
| 2012/0241344 A1 | 9/2012 | Gronau |
| 2012/0252564 A1 | 10/2012 | Moore et al. |
| 2012/0282998 A1 | 11/2012 | Emori |
| 2013/0217474 A1 | 8/2013 | Yang |
| 2013/0316797 A1 * | 11/2013 | Gelinotte ............ G07F 17/3248 463/25 |
| 2017/0039807 A1 | 2/2017 | Shigeta |

FOREIGN PATENT DOCUMENTS

| | | |
|---|---|---|
| JP | 201471599 | 4/2014 |
| WO | WO2016187164 | 11/2016 |

OTHER PUBLICATIONS

International Search Report for Application No. PCT/US2016/032797 dated Aug. 30, 2016; 2 pps.
Office Action for U.S. Appl. No. 15/813,151 dated Dec. 4, 2019; 12 pps.
Notice of Allowance for U.S. Appl. No. 5/813,151 dated Mar. 25, 2020; 6 pps.
Notification of Material Filed by a Third Party for Australian Application No. 2016265851, dated Nov. 2, 2020; 31 pps.
First Examination Report for Australian Application No. 2016265851, dated Sep. 15, 2020; 31 pps.
Office Action for Chinese Application No. 201680024120.2 dated Mar. 25, 2020; 2 pps.
Office Action for Chinese Application No. 201680024120.2 dated Oct. 12, 2020; 13 pps.
Office Action for Philipine Application No. 1-2017-501686 dated Jun. 18, 2021; 5 pps.
Second Examination Report for Australian Application No. 2016265851, dated Aug. 19, 2021; 4 pps.
Third Examination Report for Australian Application No. 2016265851, dated Sep. 10, 2021; 4 pps.
First Examination Report for Australian Application No. 2016265851, dated Oct. 5, 2021; 6 pps.
Office Action for Philippine Application No. 1-2017-501686 dated Sep. 9, 2021; 4 pps.
Notice of Allowance for Philippine Application No. 1-2017-501686 dated Sep. 27, 2021; 3 pps.
Second Examiner's Report for Australian Patent Application No. 2021232726 dated Jan. 21, 2022; 6 pps.

* cited by examiner

Chip Tray Inventory

| DENOM | COUNT | VALUE |
|---|---|---|
| 10,000,000 | | |
| 5,000,000 | | |
| 1,000,000 | 2 | 2,000,000 |
| 500,000 | 2 | 1,000,000 |
| 100,000 | 29 | 2,900,000 |
| 25,000 | | |
| 10,000 | 16 | 160,000 |
| 5,000 | 16 | 80,000 |

| DENOM | COUNT | VALUE |
|---|---|---|
| 1,000 | 5 | 5,000 |
| 500 | 82 | 41,000 |
| 100 | 17 | 1,700 |
| 50 | | |
| 25 | 16 | 400 |
| 10 | | |
| 5 | 15 | 75 |
| 2.50 | | |
| TOTAL | 200 | 6,188,175 |

OPENER

| Actual | Expected | Variance |
|---|---|---|
| 6,188,175 | 6,191,175 | -3,000 |

Out of Balance / Manual Scan

New variance (-10,800) + carryover (7,800) = variance (-3,000)

FIG. 5B

SYSTEMS AND METHODS FOR UTILIZING RFID TECHNOLOGY TO FACILITATE A GAMING SYSTEM

CLAIM OF PRIORITY

The present application is a Divisional Application of U.S. application Ser. No. 15/813,151 filed on Nov. 14, 2017 in the name of Moore et al. and titled SYSTEMS AND METHODS FOR UTILIZING RFID TECHNOLOGY TO FACILITATE A GAMING SYSTEM, which application is a Continuation application of PCT Application No. PCT/US2016/032797, filed on May 16, 2016 in the name of Moore et al. and titled SYSTEMS AND METHODS FOR UTILIZING RFID TECHNOLOGY TO FACILITATE A GAMING SYSTEM. This PCT Application claims priority under 35 U.S.C. § 119(e) to, and is a non-provisional of, U.S. Provisional Patent Application No. 62/161,915 filed on May 15, 2015 filed in the name of Moore et al. and titled SYSTEMS AND METHODS FOR UTILIZING RFID TECHNOLOGY TO FACILIATE A GAMING SYSTEM. The content of each of the above-referenced applications is hereby incorporated by reference herein for all purposes.

INTRODUCTION

The present embodiments are directed to tracking of activity at table games and within a gaming establishment and particularly to using radio frequency identification (RFID) technology to track and manage RFID-enabled game elements and game activity utilizing such game elements. In some embodiments, systems are provided which perform functions responsive to data obtained from RFID-enabled game elements. Such functions may comprise, for example, managing, tracking and alerting personnel to a status of an inventory of a game element container (e.g., RFID-enabled wagering chips in a dealer's RFID-enabled chip tray at a table game), such that missing game elements and out-of-balance events can be detected and communicated (and, in some embodiments, rectified) in a timely and useful fashion.

BRIEF DESCRIPTION OF THE DRAWINGS

FIG. 5B illustrates the example user interface of FIG. 5A with indicators of an out of balance status of the corresponding RFID-enable chip tray being highlighted.

DETAILED DESCRIPTION OF SOME EMBODIMENTS

Figure 1:
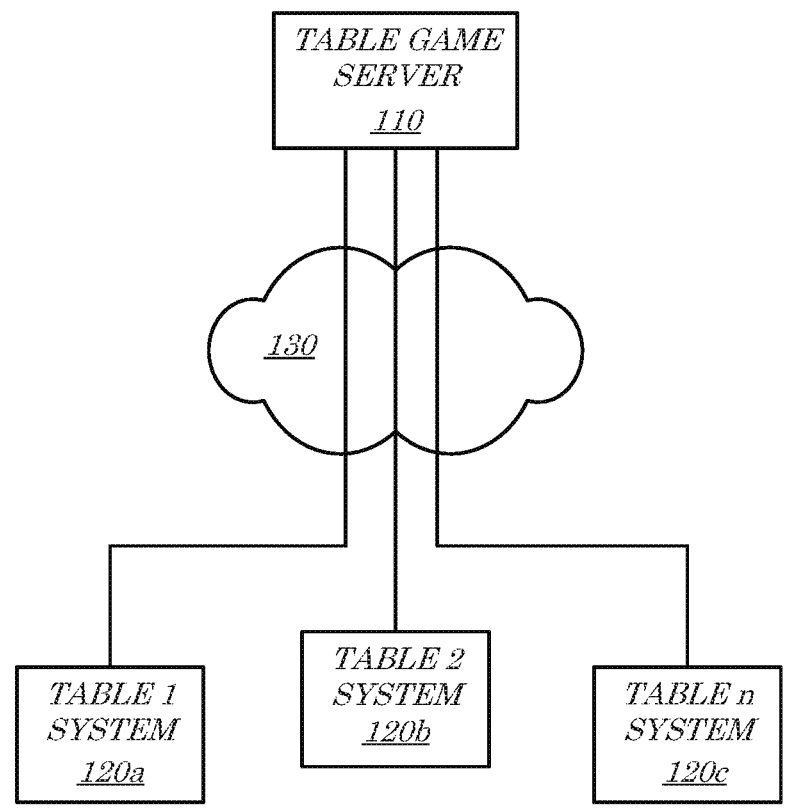
FIG. 1 illustrates an example system operable to facilitate at least some embodiments described herein.

Described herein are systems, processes and articles of manufacture which provide for facilitating wagering activity on an RFID-enabled table (e.g., wagering activity in a baccarat, blackjack or roulette game). An RFID-enabled table, as the term is used herein, comprises a table operable to facilitate a game (e.g., a card game such as baccarat) and equipped with at least one RFID antenna or interrogator (described in more detail elsewhere herein) that is operable to detect, and read data from, RFID-enabled game elements placed on the table (e.g., RFID-enabled wagering chips placed on bet spots on the table or other game elements that correspond to monetary value). In accordance with some embodiments, systems, processes and articles of manufacture provide for leveraging the RFID-tracking capability of the table in for functions such as tracking (e.g., in real-time) the inventory of an RFID-enabled game element container (e.g., a chip tray) associated with such a table, comparing expected inventory data to actual inventory data of the game element container, determining out-of-balance events and alerting personnel to out-of-balance or other events based on the game element inventory data in a timely manner that allows for correction of the out-of-balance events (particularly for variances greater than a predetermined threshold that are of particular concern to a game provider) and thus prevents or minimizes significant revenue losses to a game provider. In some embodiments, a table system is operable to prompt a dealer or other casino personnel to correct or rectify an out-of-balance event determined for a game element container (e.g., a chip tray) in an efficient and timely manner (e.g., prior to closing out the current hand or prior to initiation of the next hand, when the players of the current hand are still at the table). For example, the system may output to the dealer sufficient information (e.g., player position corresponding to a game element that is missing from a game element container, a value or other characteristic of the game element that will allow the dealer to quickly and efficiently identify the game element on the game surface, etc.) to allow the dealer to efficiently correct the out-of-balance event without undesirable slowdown or interruption to the flow of the game and before players have a chance to leave the game. Such corrective action may, in some embodiments, only be prompted for certain levels or magnitudes of variances or out-of-balance events.

Applicant has recognized that in many situations it is difficult to rectify an out-of-balance event (e.g., by tracking down and collecting a wagering chip that a dealer failed to collect from a player at the end of a hand or that a dealer overpaid to a player) if the correcting activity is not done in real time as the game event that is the source of the out-of-balance event is being finalized. After the finalization of game play for a game event, players may move to different games or game activity in subsequent game events may introduce complexities and movement of game elements that make it burdensome or unreliable to accurately determine a source of an out-of-balance event and/or collect a game element from a player for a previously completed game event (or to do so in a manner that does not raise the irritation or other negative reaction of players).

To date, game providers are often made aware that dealers incorrectly collected payments or value during game events (or paid out incorrect payments or value) after game events are completed (e.g., based on end-of-shift or end-of-day accounting reports) but are unable to correct these mistakes afterwards based on at least the reasons described above, and are thus forced to absorb the resulting revenue losses (which can sometimes result in significant amounts of losses, such as thousands or even millions of dollars over a course of a year). Accordingly, the provision of real-time information to a dealer or other casino personnel, that not only provide an indication of an out-of-balance or variance status of a game element container but also provides information about a particular game element (or characteristic of a particular game element) that allows the dealer or other casino personnel to correct the out-of-balance or variance status relatively close to the game event that is the source of the status. The capabilities and efficiencies of the inventive RFID-enabled table systems described herein allow for sufficient data to be read from game elements on the table, and from a game element container during game play that, when combined with Applicant's program logic employed by the processor(s) of the table system, allows for specific and timely information to be provided to a dealer or other casino personnel at the end of each game event (e.g., hand of a baccarat game). This allows for game providers to prevent or minimize significant losses due to incorrect collection or payment of value during game play that was previously absorbed by the game providers.

Various embodiments described herein will refer to a game element container comprising a chip tray and game elements comprising wagering chips, for illustrative purposes. Other types of game elements are within the scope of the present description (e.g., cards, dice, tokens) as are other types of game element containers (e.g., card shoes, containers for storing dice or tokens).

In accordance with some embodiments, the system is operable to determine and track the location and movement of RFID-enabled chips on the table and into/out of the dealer's chip tray, allowing for determination of game event data throughout a game, as well as chip inventory data based on expected payouts, commissions, lost wagers, refills and other events which can cause modifications to an inventory of a chip tray.

In accordance with some embodiments, a system is provided which includes at least one table having a plurality of antennas or interrogators placed thereon, for use in recognizing the placement of an RFID-enabled chip on one or more positions of the table or components of the table (e.g., an RFID-enabled chip tray).

In accordance with some embodiments, a smart table system which comprises at least one processor and a memory is operable to track the expected balance of its integrated RFID-enabled chip tray and alerts staff to one or more predetermined events (e.g., the count and value of missing chips). In one embodiment, the system validates every RFID chip that enters and leaves the RFID-enabled chip tray against at least one transaction or game event (e.g., a fill event, a payout event, a commission collection event, a losing event, etc.). The system may further be operable to alert a user (e.g., gaming establishment personnel) if a variance is identified as between RFID-enabled chips which are expected to be in the RFID-enabled chip tray and RFID-enabled chips which are actually detected as being in the RFID-enabled chip tray. A difference or variance between expected data (e.g., an expected value, count and/or particularly identified chips which are expected to be in the RFID-enabled chip tray based on previously determined data and one or more intervening transactions or game events) and actual data (e.g., an actual value, count and/or particularly identified chips which are detected to be in the RFID-enabled tray) is referred to herein as a "tray variance" or "out of balance" status or condition of the tray. In one embodiment a process for determining whether a tray variance is present may be performed periodically, non-periodically upon an occurrence of a predetermined event or at a request of a user. For example, a process for determining whether a tray variance is present with respect to a particular RFID-enabled chip tray may be performed (e.g., by a processor of a smart table, a processor of a server device operable to receive data from a smart table and/or a processor of the RFID-enabled chip tray) (i) after every game or hand of a game; (ii) after each RFID-enabled chip transaction throughout the day; and/or (iii) on-demand when a user requests an inventory scan of the RFID-enabled chip tray.

In accordance with some embodiments, a table system may be operable to detect or recognize tray variances due to one or more of the following "missing chip" scenarios: (i) stolen chips; (ii) chips lost by a player in a wager not being properly collected by the dealer; (iii) a dealer overpaying a player; (iv) erroneous credit and/or fill transactions; and (v) missing banker commissions.

In accordance with some embodiments, when a chip tray is determined to have an out of balance status or there is determined to be a tray variance with respect to a particular RFID-enabled chip tray, one or more events and/or outputs may be triggered. In one embodiment, an "out of balance" notification or message may be output to a user (e.g., to a dealer dealing chips out of the tray, a supervisor or other personnel of a gaming establishment). For example, (i) an on-screen balance indicator may indicate an "out of balance" status of the chip tray (e.g., as illustrated in FIG. 5B); (ii) an "actual tray balance" value may be updated while an "expected tray balance" value may remain unchanged from a previously determined value; (iii) a "variance in balance" value may be updated to reflect the value of missing chip(s) or the difference in the actual tray balance and the expected tray balance; (iv) an inventory message area of a user interface may display an out of balance message that includes the expected balance, the actual balance and the variance amount; (v) a user alert may be generated and output on a screen, page or area of a user interface, indicating the expected balance, actual balance and the variance amount; and/or (vi) a text, SMS or e-mail message may be generated and transmitted to one or more users, including without limitation, dealers, supervisors, and security personnel.

As described, one cause for an RFID-enabled chip being missing from a tray may be fraudulent (e.g., intentional and unauthorized) removal of the RFID-enabled chip from the chip tray (e.g., by casino personnel or a player). In such a scenario, the missing chip or missing chip value may be identified, for example: (i) upon the next on-demand scan of the tray's inventory; (ii) when a Fill transaction is submitted or confirmed; (iii) when a Credit transaction is submitted; and/or (iv) after the next end-of-game (or end-of-hand) inventory scan and inventory check.

Another cause for an RFID-enabled chip being missing from a tray may be a dealer inadvertently or erroneously not collecting the chip from a player upon a player losing a wager (e.g., the dealer collects an incorrect, lower, number or value of chips when collecting the losing wagers from the table upon a conclusion of a hand or other game event). In such a scenario, the missing chip or missing chip value may be identified, for example: (i) in real-time at the end of the hand when a losing chip is not taken by the dealer or is taken by a player instead of the dealer; and/or (ii) during an end-of-game inventory scan and inventory check which identifies a tray variance.

In some embodiments, an out of balance notification or alert may be triggered upon a tray variance being identified (e.g., due to a fraudulently removed chip or an uncollected chip that should have been collected from elsewhere on the table and placed into the RFID-enabled chip tray). In some embodiments, such an out of balance notification may include data or information indicating at least one of (i) the table position from which the losing chips are missing (or from which the chip(s) were not collected), (ii) a player identifier associated with the missing chip(s); (iii) the total value of the missing chips, and (iii) the count by denomination and/or chip set of each missing chip.

Yet another cause for an RFID-enabled chip being missing from a tray may be a dealer overpaying a winning bet spot. In some embodiments the dealer may then attempt to correct the error by removing the overpayment from the appropriate player's position, but then giving the chip(s) to a winning player or removing the chip(s) from the table instead of placing the chip(s) into the chip tray. In such a scenario an out of balance notification or alert may include additional detail such as at least one of (i) the table position where the overpayment event occurred; (ii) the total value of the overpaid chips; and (iii) the count by denomination and/or chip set of each overpaid chip.

Another cause for an RFID-enabled chip being missing from a tray may be a user (e.g., a dealer or other gaming establishment personnel) initiating a Credit or Fill transaction, but then fraudulently removing an RFID-enabled chip from the tray and then either attempting to complete the transaction, or cancelling the transaction. In accordance with some embodiments, a cancellation or attempted cancellation of an in-progress Credit or Fill transaction may trigger an inventory scan and audit (e.g., an initiation of a process which compares expected data to actual data). If a result of such an inventory scan and audit is a determination that chip(s) were not returned to the chip tray as expected or were added to the tray in error, an out of balance notification or alert may be generated and/or output. In one embodiment, if a user initiates a Fill transaction, but then fraudulently removes one or more chips after the Fill chips are placed in the tray and the transaction is finalized, an out of balance notification or alert may be generated and/or output. In some embodiments, a confirmation of a Fill transaction may automatically trigger a secondary scan that confirms that all chips identified as part of the chip fill transaction (e.g., as detected on an antenna in a dealer position or area of the table) are subsequently verified as being present in the RFID-enabled chip tray when the transaction is confirmed by the user.

Yet another cause for an RFID-enabled chip being missing from a tray may be a dealer's failure to collect the accurate commission payments from one or more players. In some baccarat games, a gaming establishment collects a fee (e.g., a percentage of a win amount and/or a wager amount) for certain wagers or results (e.g., the gaming establishment may collect 5% from certain win amounts as its commission). An error may occur, for example, when a dealer pays a winning bet (e.g., a winning Banker bet) in the full or "gross" amount but does not take the correct commission payment from the player. In accordance with some baccarat rules, a Winning Banker wager may be paid 1 to 1 but the player must pay the house a 5% commission, effectively lowering the payout to 95% of the bet amount. Frequently a dealer will pay the winning bet the full amount (1 to 1 payout) and then collect the 5% commission from the player. Common errors associated with this transaction include the dealer failing to collect the 5% commission owed after paying the full or gross payout, a player under-paying the value of the commission, or a guest paying the commission with chips over the value of the commission requiring the dealer to make change for the 5% payment which can be an arithmetically challenging and error-prone calculation than can result in overpaying the bet and/or under collecting the commission owed by the player. In some embodiments, an out of balance notifications or alert generated and/or output based on a tray variance attributed to an erroneous commission fee collection may include information such as the positions where winning banker bets were paid in gross. In some embodiments, payments of commission fees (or collection by a dealer of such fees) may also be tracked during game play. For example, a feature of the system may be operable to uniquely identify the count, denomination and total value of RFID-enabled chips a player contributes toward the payment of the commission due (e.g., a commission due on a winning Banker wager). Such a tracking feature may ensure that the full and correct value of commissions are consistently collected (e.g., for winning Banker bets) and that when players over-pay commission the dealer is prompted to return the correct change.

Figure 3:
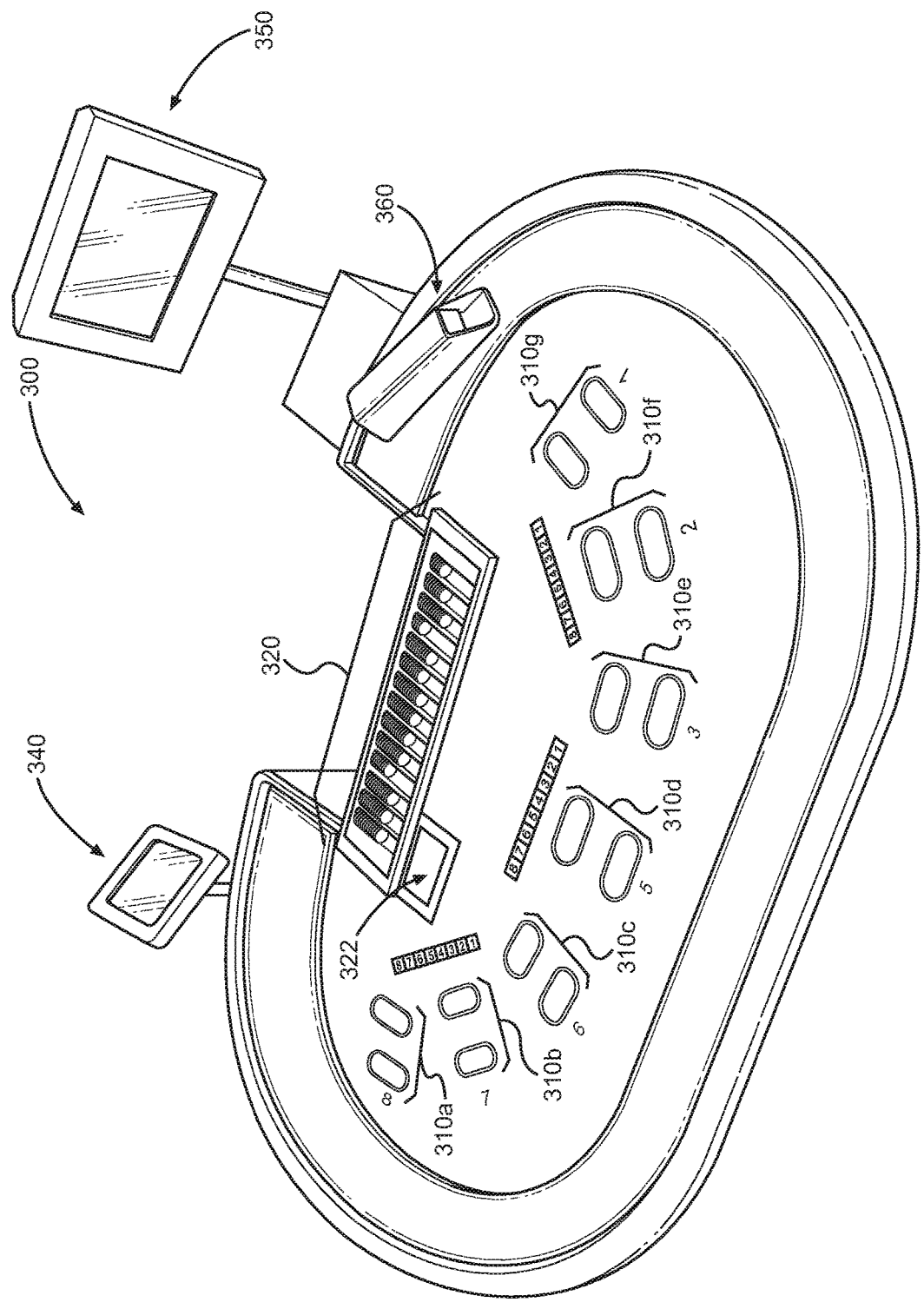
FIG. 3 illustrates a top planar view of a smart table for facilitating a baccarat game, in accordance with some embodiments.

In accordance with some embodiments, a smart table system includes a dealer display (e.g., as illustrated in FIG. 3), which may comprise a display facing the dealer and for outputting information to the dealer. The dealer display may, in some embodiments, be operable to receive data and/or instructions from a processor (e.g., a processor integrated with the dealer display, another processor of the table at which the dealer display is located and/or a remote processor of a server device) and to output information to the dealer based on this data and/or instructions. The data and/or instructions may be based on data read from one or more RFID-enabled chips in the RFID-enabled chip tray of the table or elsewhere on the table. For example, the dealer display may be utilized to show, per position on the table, the amount of commission owed and the payout value (e.g., net commission) for each winning bet (e.g., each winning Banker bet) per player position. The commission payment tracking feature may be configured to track the player's commission contribution on either or both the Player/Banker betting antennas located at the player's table position. When chips are added to a Player/Banker bet spot in a value that is neither the net nor the gross payout value for the winning Banker bet, the chips may, in some embodiments, be flagged as comprising the player's contribution toward their owed commission. That value may then be utilized to update both the "commission owed" and the "payout value" amounts output on the dealer display. The dealer may, in some embodiments, be prompted to pay the indicated payout amount(s) and the collect player commission contribution(s). For example, in some embodiments an instruction or prompt may be output to a dealer via a dealer display. In some embodiments, the dealer display may further be operable, based on data and/or information received from a processor, to output at least one of the following prompts to the dealer, as appropriate under the circumstances:

1. If the player does not contribute toward their commission payment, the dealer may be prompted to pay the winning bet net commission owed;
2. If the player contributes an amount in excess of commission owed, the dealer may be prompted to payout net payout plus change owed;

3. Where the player contributes an amount less than their commission owed, the dealer may be prompted to reduce the corresponding payout accordingly.

In accordance with some embodiments, a table system which includes an RFID-enabled chip tray as well as various antennas for reading information from RFID-enabled chips placed on the table, may be operable to perform a verification validating the placement of the appropriate player's commission payment chips (and the correct values of such placed chips, based on an expected commission amount which has been calculated based on game data) into the chip tray before end-of-game (e.g., before a new hand is allowed to be dealt or initiated). In some embodiments, such a verification of the appropriate placement of RFID-enabled chips into the chip tray may be performed during an inventory scan and audit check performed at another time.

Various systems and several examples are provided herein. The present disclosure will focus on baccarat as an example, but it should be appreciated that similar functionality may be applied to other RFID-enabled table games such as blackjack, roulette, craps, Sic Bo, Pai Gow (tile and poker variations), LET IT RIDE™, CARIBBEAN STUD™, 3-CARD POKER, 4-CARD POKER, SPANISH 21, variants of such games (e.g., Chemin de Fer), or the like.

Referring now to FIG. 1, illustrated therein is a system 100 which may be useful in implementing at least some embodiments described herein. The system 100 may comprise, for example, a system within a particular gaming establishment which includes a plurality of smart tables for facilitating card games. In accordance with at least some embodiments, the system 100 includes a table game server 110 (e.g., for managing chip, player and/or game activities at one or more connected smart tables) that is in communication, via a communications network 130, with one or more table systems 120. The table game server 110 may communicate with the table systems 120 directly or indirectly, via a wired or wireless medium such as the Internet, LAN, WAN or Ethernet, Token Ring, or via any appropriate communications means or combination of communications means. Each of the table systems 120 may comprise computers, such as those based on the INTEL® PENTIUM® processor, that are adapted to communicate with the table game server 110. Any number and type of table systems 120 may be in communication with the table game server 110, although only three (3) in the example of FIG. 1.

Communication between the table systems 120 and the table game server 110, and (in some embodiments) among the table systems 120, may be direct or indirect, such as over the Internet through a Web site maintained by table game server 110 on a remote server or over an on-line data network including commercial on-line service providers, bulletin board systems and the like. In yet other embodiments, the table systems 120 may communicate with one another and/or table game server 110 over RF, cable TV, satellite links and the like.

Some, but not all, possible communication networks that may comprise network 130 or be otherwise part of system 100 include: a local area network (LAN), a wide area network (WAN), the Internet, a telephone line, a cable line, a radio channel, an optical communications line, a satellite communications link. Possible communications protocols that may be part of system 100 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In some embodiments, the table game server 110 may not be necessary and/or preferred. For example, at least some embodiments described herein may be practiced on a stand-alone table system 120 and/or a table system 120 in communication only with one or more other table systems 120 or a dedicated server device. In such an embodiment, any functions described as performed by the table game server 110 or data described as stored on the table game server 110 may instead be performed by or stored on one or more table systems 120.

Figure 2:
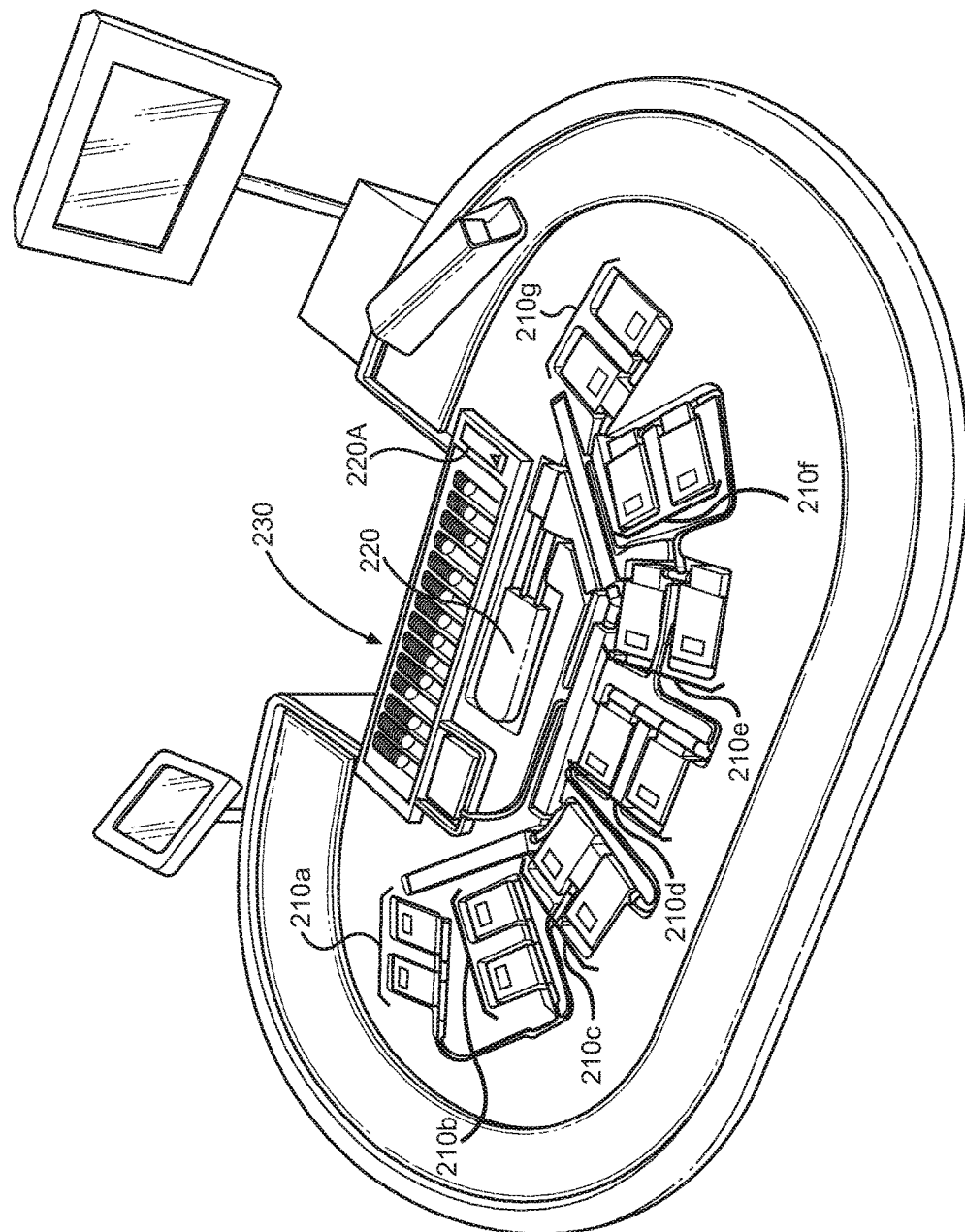
FIG. 2 illustrates a diagram of an antenna or interrogator layout on a smart table for facilitating a baccarat game, in accordance with some embodiments.

Referring now to FIG. 2, illustrated therein is one embodiment of how a plurality of interrogators or antennas may be placed on a table (which may be one embodiment of table system 120 of FIG. 1), in a manner that facilitates some of the embodiments described herein. The table illustrated in FIG. 2 includes seven (7) distinct player positions arranged in a semi-circular configuration. Placed at each respective player position is a set of two antennas or interrogators 210a-210g, one for each bet spot or bet position available at each respective player position. For example, one antenna at a respective player position may be for recognizing a bet on Banker (e.g., recognizing RFID-enabled chips placed on the Player bet spot) and the other antenna may be for recognizing a bet on Player (e.g., recognizing RFID-enabled chips placed on the Player bet spot). Thus, if a player were to place a wager (e.g., one or more RFID-enabled chips) on a bet spot associated with one of the antennas at the player position associated with the set of antennas 210a, the antenna would recognize such placement (i.e., the antenna nearest to which the chips are placed would "acquire" the chip(s) comprising the wager).

The table illustrated in FIG. 2 further comprises a dealer area at which is positioned an antenna 220. The dealer area antenna 220 may facilitate, for example, calculations and verifications of stack totals for table fills, credits, buy-ins and color-ups (e.g. by reading and providing data regarding one or more chips acquired by the dealer area antenna 220).

In some embodiments, a smart table such as that illustrated in FIG. 2 may include an RFID-enabled chip tray 230 within which is placed at least one antenna 220A. In some embodiments, an RFID-enabled chip tray comprises two layers or trays (e.g., an upper tray and a lower tray within the same housing) and each tray may be associated with (e.g., have placed within its area) its own antenna. For example, one antenna may be placed beneath the upper tray and function to read the chips in the upper tray while another antenna may be placed beneath the lower tray and function to reads the chips in the lower tray. In one embodiment, the trays may be read or "scanned" independently (i.e., the value or other data of chips placed therein may be read); in other embodiments, the chips in the upper and lower trays may be read simultaneously. In one embodiment, the chip tray antenna(s) 220A may interact with the dealer area antenna 220 (or a processor which receives data from both the chip tray antenna(s) 220A and the dealer area antenna 220 may take into account the data of the antenna(s) 220A along with the data of the antenna 220) to ensure that chips implicated in certain transactions (e.g., chips included in a Fill transactions) are actually recognized as having been placed into the chip tray after being counted and confirmed on the dealer antenna.

In some embodiments (not shown in FIG. 2), a table system 129 may include at least one shared or common bet positions or bet spots, each associated with a distinct antenna. For example, in one embodiment particular types of additional bets may be made available via shared or common bet positions and each such bet spot may include its own antenna: one antenna may be placed at a Player Pair bet spot, another antenna may be placed at a Banker Pair bet spot, and two antennas may each be placed at a Tie bet spot. Further, Applicants have recognized that in some cases, it may be beneficial to provide for common or "shared" betting areas. That is, rather than associating or providing a plurality of physical betting areas for each individual player seated at the gaming table, it may be beneficial to instead offer one or more common betting areas (each associated with a given wager type), accessible to all players. Each such common or shared bet spot may have associated therewith its own antenna.

In some embodiments, player wagers placed upon such shared betting areas of the gaming table may be identified and/or associated with respective player(s) having placed such wagers via one or more RFID antennas incorporated into the layout of the table itself. In one embodiment, a player desiring to place such a wager may indicate his interest in doing so (e.g. audibly, via a hand signal) to the dealer. Thereafter, the dealer may place physical chips representing the player's wager on a first dedicated area of the gaming table associated with the player (e.g., a player position of the table at which the player is sitting), the first dedicated area being associated with a particular RFID antenna. The RFID antenna may then transmit an indication of the wager amount and associated player (or player position) to a processor (e.g., a processor of the table system), which then stores data associated with the wager. Thereafter, the dealer (and/or player) may move the chips representing the player's wager to a second "shared" area of the gaming table, which may be associated with a second RFID antenna. Upon resolution of a game instance associated with the wager (e.g. upon completion of a hand of baccarat), an outcome associated with the wager is determined (e.g. win/loss) along with any corresponding payout that may be entitled to the player. If the player is entitled to a payout, the dealer may then place chips representing such payout on the second dedicated area of the table. The payout is recorded by the table computer via the second RFID antenna. The original wager and payout may then be placed on the first dedicated are (associated with the first RFID antenna), serving to thereby record an indication of the payout having been provided to the associated player.

The antennas incorporated into a table such as the table illustrated in FIG. 2 may be placed within an insert under the felt or other covering of the table. Each antenna may have a predetermined range within which it recognizes, determines, identifies or acquires a chip. Thus, if one or more chips comprising a wager is placed within the acquire range of a particular antenna, it may be inferred or determined that a player (e.g., the player who is associated with the acquired chip(s)) is placing a bet on the bet spot associated with the antenna.

It should be noted that the number and placement of antennas illustrated in FIG. 2 is exemplary only and should not be construed in a limiting manner. For example, more than two antennas may be associated with a given player position. In some embodiments, a first antenna associated with a given player position is associated with a first player (e.g., the primary player playing at that position) while a second antenna associated with a given player position is associated with a second player (e.g., a remote player or back betting player). In some embodiments, each antenna of a table may be uniquely identified, such that if data or information is received from a particular antenna, that data or communication may comprise a unique identifier of the antenna that allows for a determination of the bet spot and player position associated with that data or communication.

An antenna such as any of those illustrated with respect to FIG. 2 may determine, read, receive, obtain, recognize or determine various information or data from or about an RFID-enabled chip placed within a predetermined range of the interrogator. The following are examples or some of the information or data that may be so determined: (i) a unique chip identifier, which uniquely identifies the chip; (ii) a currency of the chip; (iii) a denomination of the chip (which may be its monetary value; in the case of a token it may comprise the token type); (iv) a chip set identifier, which differentiates types of chips or represents a category of a chip (e.g., cash vs. non-negotiable, promotional, differentiating tokens from monetary chips, chip validity); (v) a casino identifier that uniquely identifies a casino or other registered gaming corporation associated with the chip (this information may also be used to determine chip validity); (vi) a site identifier that uniquely identifies a location for which the chip is valid; (vii) a gaming company identifier that uniquely identifies a casino or other registered gaming corporation, and (v iii) a "casino site" identifier that uniquely identifies the physical casino site It should be noted that not all of the above information is necessary or desirable for all embodiments. It should further be noted that any or all of the above-listed information may be stored in a memory of a given chip and transmitted to an interrogator via a signal from the chip.

An RFID-enabled chip which may be used in at least some embodiments may include (i) an RFID tag or memory, (ii) an electronic circuit or processor and (iii) an antenna. An RFID-enabled chip usable in at least some embodiments may be similar or identical to those disclosed in U.S. Pat. Nos. 5,166,502; 5,676,376; 6,021,949; and 6,296,190, and U.S. Patent Application Publication Nos. 2004/0207156 and 2004/0219982 which are all incorporated by reference in their entireties. No particular type of RFID-enabled chip is required for the embodiments described herein, so long as the chip can support the functionality described with respect thereto. In some embodiments, each chip may store in its memory (and communicate to an antenna of a table as described herein) a unique serial number, a chipset identifier, an associated player identifier or other information. The gaming establishment (e.g., casino) or other entity may associate values, categories, denominations or other values with each serial number. The association may be in a look-up table or the like. Alternatively, the unique identifier of a given chip may be encoded to include information therein. Likewise, a chip may be color-coded or include other indicia that indicates a value or other information to the player or dealer. In some embodiments, plaques may be used instead of chips (e.g., for exceedingly large denominations).

In some embodiments, an RFID-enabled chip may be an active chip which includes its own battery or power source. In other embodiments, an RFID-enabled chip may be a passive chip which does not include its own power source. In on embodiment, an electronic circuit and antenna of a given chip may act as a transponder capable of responding to an interrogator or antenna of the table (e.g., an antenna of an RFID-enabled chip tray of the table). The interrogator or antenna may be a sensor or other component operable to detect, recognize, determine, identify or sense the presence (or absence) of an RFID-enabled chip. The interrogator or antenna may also be operable to detect, determine, identify, recognize or receive various information about a chip (e.g., chip identifier, chip set identifier, chip denomination, chip status, etc.). The interrogator or antenna of a table or chip tray may also be operable to transmit information to one or more processors or memories (e.g., information regarding the presence or absence of a chip in a certain location, an identifier of a chip, etc.). Such one or more processors or memories may be components of (i) a table, (ii) a component of a table (e.g., of a dealer display or chip tray) and/or (iii) a server device operable to communicate with one or more tables.

In accordance with some embodiments, an interrogator or antenna of a table (E.g., an antenna of the set of antennas 210a and/or an antenna 220A of a chip tray) may send out an electromagnetic signal that impinges upon the antenna of an RFID-enabled chip, exciting a current within electronic circuit of the chip. In response to the excited current, the electronic circuit of the chip may cause the antenna of the chip to emit a second electromagnetic signal as a response, which is received by the interrogator or antenna of the table which had sent out the electromagnetic signal. The second signal may comprise identifying information about the chip such that the interrogator can identify the chip on receipt of the second signal. The second signal may be generated passively or actively. That is, in a first embodiment, the energy from the interrogation signal provides sufficient power for the electronic circuit of the chip to use to send the second signal. In a second embodiment, the electronic circuit of the chip may include a battery or other power source, which is used to power the generation of the second signal.

Referring now to FIG. 3, illustrated therein is a planar view of a smart table 300, which may be operable to facilitate one or more embodiments described herein. The table 300 may comprise the table of FIG. 2, but with a felt or other covering hiding the antennas placed underneath. In many respects, the smart table 300 may appear to a player as a regular baccarat table, with the RFID capabilities of the table not being readily discernable. The table 300 is configured for a baccarat game but the embodiments described herein are not limited to baccarat and a similar table may be provided with a top layout appropriate for facilitating another game (e.g., blackjack).

The rules of baccarat are well understood, but the interested reader is directed to www.wizardofodds.com/baccarat for a more detailed explanation. Table 300 comprises a smart table configured to facilitate a baccarat game and includes a dealer area within which is located a dealer display 322 and an RFID-enabled chip tray 320. The dealer display may be utilized to output data or prompts to a dealer during the course of game play (e.g., a commission amount to be collected from one or more players, a payout to be provided to one or more players, an amount in lost wagers to be collected from one or more players, an alert regarding one or more missing chips which is to be rectified by the dealer, etc.).

The table 300 further includes seven (7) player positions 310a-310g, each player position including a Banker bet spot and a Player bet spot. Of course, any number of player positions may be utilized. Further, in some embodiments the table may include additional bet spots such as shared or common bet spots.

The table 300 further includes a display 340 which a dealer or other gaming establishment personnel may utilize to access information regarding game events, transactions, chip tray variances or other data related to the table 300. For example, a software application having user interfaces and information such as that illustrated in FIGS. 5A, 5B and/or 6 may be accessible via the display 340.

The table 300 further includes another display 350 which faces the players and may show data to players such as recent historical outcomes (sometimes referred to as a "trend board"). Players sometimes use such historical outcomes in an effort to predict trends within a series of game instances. The table 300 further includes an electronic card shoe 360 via which cards for the game are shuffled and dealt. In accordance with some embodiments, the electronic card shoe 360 may communicate with a processor (e.g., a processor of the table 300) to communicate data regarding cards dealt and/or remaining in the shoe.

The table 300 may include additional components (at least some of which may not be easily visible to a player or other observer) such as one or more processors, a memory storing a general program and one or more specialized software applications which, in combination with data obtained from the RFID antennas located on the table, may facilitate many of the functions described herein (e.g., tracking wagering activity and game outcomes, tracking expected and actual inventory of a dealer's chip tray, calculating payouts due to players and losses incurred by players to aid dealers in providing accurate payouts and collecting accurate losses and commissions, calculating dynamic odds, dynamically determining information about possible re-characterization bets, etc.).

Figure 4:
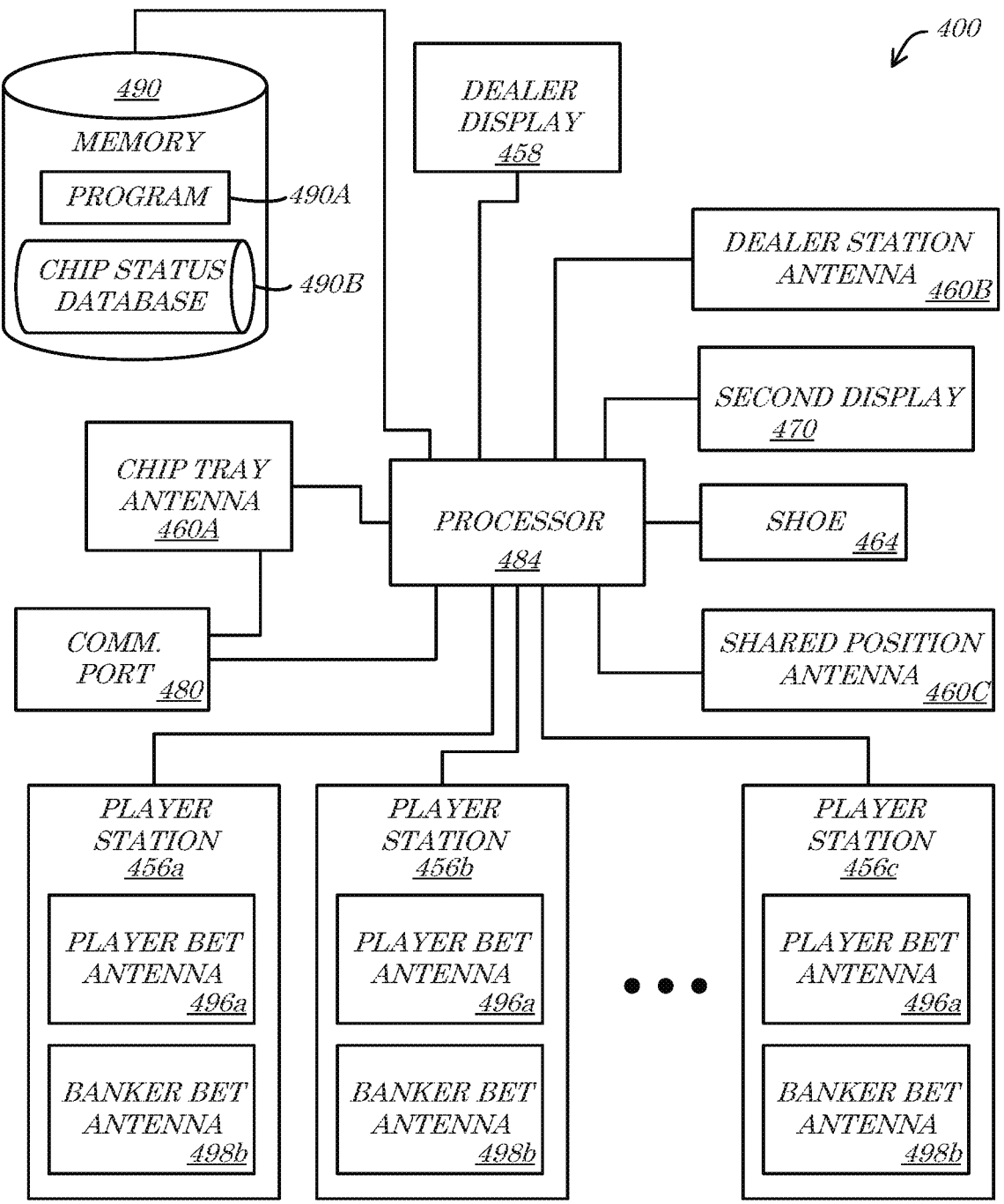
FIG. 4 illustrates a block diagram of a table system operable to facilitate at least some embodiments described herein.

Referring now to FIG. 4, illustrated therein is a block diagram of a table system 400 consistent with some embodiments described herein. The table system 400 may comprise, for example, a table system 120 of FIG. 1. The table system 400 may be implemented as a system controller, a dedicated hardware circuit, an appropriately programmed computer which is a component or peripheral device of a table for facilitating a card game, or any other equivalent electronic, mechanical or electro-mechanical device.

The table system 400 comprises a processor 484, such as one or more INTEL® PENTIUM® processors. The processor 484 may be in communication with a memory 490 and a communications port 480 (e.g., for communicating with one or more other devices). The memory 490 may comprise an appropriate combination of magnetic, optical and/or semiconductor memory, and may include, for example, Random Access Memory (RAM), Read-Only Memory (ROM), a compact disc, tape drive, and/or a hard disk. The memory 490 may comprise or include any type of computer-readable medium. The processor 484 and the memory 490 may each be, for example: (i) located entirely within a single computer or other device; or (ii) connected to each other by a remote communication medium, such as a serial port cable, telephone line or radio frequency transceiver. In some embodiments, the table system 400 may comprise one or more devices that are connected to a remote server computer for maintaining databases.

The memory 490 may store a program 490A for controlling the processor 484. The processor 484 may perform instructions of the program 490A, and thereby operate in accordance with at least one embodiment described herein. The program 490A may be stored in a compressed, uncompiled and/or encrypted format. The program 490A may include program elements that may be necessary or desirable, such as an operating system, a database management system and "device drivers" for allowing the processor 484 to interface with computer peripheral devices (e.g., an RFID-enabled chip tray, an electronic shoe, a camera, any of which may provide data to the processor 484). Appropriate program elements are known to those skilled in the art, and need not be described in detail herein.

The term "computer-readable medium" as used herein refers to any medium that participates in providing instructions to processor 305 (or any other processor of a device described herein) for execution. Such a medium may take many forms, including but not limited to, non-volatile media, volatile media, and transmission media. Non-volatile media include, for example, optical or magnetic disks, such as memory 490. Volatile media include dynamic random access memory (DRAM), which typically constitutes the main memory. Transmission media include coaxial cables, copper wire and fiber optics, including the wires that comprise a system bus coupled to the processor 484. Transmission media can also take the form of acoustic, electromagnetic, or light waves, such as those generated during radio frequency (RF), microwave, and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Various forms of computer readable media may be involved in carrying one or more sequences of one or more instructions to processor 484 (or any other processor of a device described herein) for execution. For example, the instructions may initially be borne on a magnetic disk of a remote computer. The remote computer can load the instructions into its dynamic memory and send the instructions over a telephone line using a modem. A modem local to a table system 400 may be operable to receive the data on the telephone line and use an infrared transmitter to convert the data to an infrared signal. An infrared detector can receive the data carried in the infrared signal and place the data on a system bus for processor 484. The system bus may carry the data to a main memory, from which processor 484 may retrieve data and execute instructions. The instructions received by main memory may optionally be stored in memory 490 either before or after execution by processor 484. In addition, instructions may be received via communication port 480 as electrical, electromagnetic or optical signals representing various types of information. According to some embodiments of the present invention, the instructions of the program 490A may be read into a main memory from another computer-readable medium, such from a ROM to RAM. Execution of sequences of the instructions in program 490A may cause processor 484 to perform at least some of the functions described herein. In alternate embodiments, hard-wired circuitry may be used in place of, or in combination with, software instructions for implementation of at least one embodiment described herein. Thus, embodiments described herein are not limited to any specific combination of hardware and software.

The memory 490 may also store at least one database, such as chip status database 490B. In some embodiments, some or all of the data described herein as being stored in the database 490B may be partially or wholly stored (in addition to or in lieu of being stored in the memory 490 of the table system 400) in a memory of one or more other devices, such the table game server 110 (FIG. 1). In accordance with some embodiments, the chip status database may store chip identification data and/or chip status data (e.g., denomination, unique chip identifier, chipset identifier, gaming establishment identifier, chip value, player identifier associated with chip identifier, validity of chip, etc.). In some embodiments, the memory 490 may store additional data regarding movement, location or wagering activity which has occurred on the table. For example, chip movement history (e.g., an indication of which antennas or table bet positions a particular chip has been acquired at, a time at which it was acquired at a particular antenna, a time at which it was determined to no longer be at that antenna, etc.) may be stored (e.g. for determining shared bets). In some embodiments, a history of chip movements may be stored (e.g., in a file-based archive log) on another device (e.g., in a memory of table game server 110 of FIG. 1).

The processor 305 is also operable to communicate with one or more display devices: (i) a dealer display 458 (e.g., one or more displays such as display 340 and/or display 322 of FIG. 3) and a second display 470. The second display 470 may comprise, for example, a display for displaying historical outcomes or other game information to a player (e.g., a trend board, such as described with respect to display 350 of FIG. 3). The dealer display 458 may output information such as (i) prompts for how much should be collected from players in commission or losing wagers (e.g., for each player position involved in the hand); (ii) prompts for how much should be paid out to players for winning wagers (e.g., for each player position involved in the hand); (iii) tray variance or out-of-balance alerts, informing the dealer of missing chips from the RFID-enabled chip tray; and/or (iv) other information regarding a status of the game, including information regarding a status of one or more wagers or RFID-enabled chips being used on the table. In some embodiments, one or both of the displays 458 and 470 may include or have associated therewith its own processor, memory and program (and may be operable to communicated data to and/or from the processor 484). Either of the display devices 458 and 470 may comprise, for example, one or more display screens or areas for outputting information related to game play on the gaming system, such as a cathode ray tube (CRT) monitor, liquid crystal display (LCD) screen, or light emitting diode (LED) screen. In some embodiments, either of the display devices 458 and 470 may comprise a touch screen.

As described herein, in some embodiments an RFID-enabled chip tray may comprise one or more antennas for reading information from RFID-enabled chips placed in the chip tray. In such embodiments, the processor 484 is further operable to communicate with the one or more chip tray antenna(s) 460A. The one or more antenna(s) 460A may be operable to read data from one or more chips placed within a chip tray (e.g., chip identifier, chip set identifier, chip denomination, etc.).

The processor 484 is further operable to communicate with a shared position antenna 460C, which comprises at least one antenna on a shared or common betting area for recognizing chips placed (and removed from) the shared or common betting area. In some embodiments, the processor may receive from an antenna 460 data regarding chips placed on a common betting area and determine, based on this data and additional data stored in memory (e.g., a player identifier or last player position associated with the chip that has now been acquired at the shared position antenna 460C) that a particular bet has been made by a particular player or for a particular player position.

The processor 484 is further operable to communicate with a plurality of antennas at player positions placed on the table. As described with respect to FIGS. 2 and 3, in some embodiments each player position of a table may have a corresponding Player bet area and a Banker bet area and each such area may have associated therewith its own antenna for determining that a chip has been placed with its area. The table system 400 illustrates three player positions 456 (456*a*, 456*b* and 456*c*) as each having two antennas associated therewith: a player bet antenna 496*a* and a banker bet antenna 498*b*. Each such antenna may be uniquely identifiable by, for example, (i) a unique identifier associated therewith, and (ii) an identification of a port or other component of the table associated with the antenna (e.g., the port into which the antenna is plugged into may have a unique identifier associated therewith) and such unique antenna identifier may be transmitted to or recognized by the processor 484 when chip information regarding a chip acquired by a respective antenna is transmitted to the processor 484, such that the processor 484 may be programmed to determine which player position and which betting area within the player position the chip has been placed within. In some embodiments, a single player station 456 may include interrogators associated with two or more players. For example, one interrogator may be intended for a first player playing the game at the table and another interrogator for a second player (e.g., a "back bettor") who may be betting along with or in association with the first player, either remotely or from essentially the same location, but whose chips and betting activity is to be separately tracked. In some embodiments, the chip status database 490B may store detailed data with information regarding chips identified at a table, such details being associated with a chip identifier of each chip for which data is stored (e.g., chip value, chip denomination, chipset identifier or other indicator of a category or characteristic associated with a chip). Storing such data at the table may allow for faster RFID scanning, since the system will not need to obtain a lot of data every time a chip is acquired or recognized by an antenna of a table (e.g., only the chip identifier may be necessary and additional information may be looked up by the system based on the chip identifier from a local database or memory).

The processor 484 is further operable to communicate with an electronic shoe 464. The shoe 464 may be an intelligent shoe such as the IS-T1™ and IS-B1™ or the MD1, MD2 sold by SHUFFLE MASTER or other such devices. The shoe 464 may be able to determine which cards are being dealt to which player station, through RFID technology, image recognition, a printed code on the card (such as a barcode), or the like. The embodiments described herein are not dependent on any particular technique used to recognize cards dealt in a card game (or cards remaining as available to be dealt). Further information about intelligent shoes may be found in U.S. Pat. Nos. 5,941,769 and 7,029,009, both of which are incorporated by reference in their entireties and U.S. Patent Application Publications 2005/0026681; 2001/7862227; 2005/0051955; 2005/0113166; 2005/0219200; 2004/0207156; and 2005/0062226 all of which are incorporated by reference in their entireties. In place of an intelligent shoe, cameras, such as may be used with pattern recognition software to detect what cards have been dealt to what player stations and what chips have been wagered at particular player stations. One method for reading data from playing cards at table games is taught by German Patent Application No. P44 39 502.7. Other methods are taught by U.S. Patent Application Publication 2007/0052167 both of which are incorporated by reference in their entirety.

The processor 484 is further operable to communicate with a dealer station antenna 460B, which comprises one or more antennas placed in a dealer area of the corresponding table. The dealer station antenna 460B may be operable to detect RFID-enabled chips which have been placed within its acquisition area, such as chips the dealer places in the area for recognizing by the system prior to placing them into the dealer tray or paying them to a player.

The processor 484 may, in some embodiments, be operable to receive the data read from the chips by the RFID antenna 460A, derive or determine first information therefrom (e.g., total value of chips within the chip tray 460A), compare the first information to second information (e.g., an expected total value of chips which is supposed to be within the chip tray 460A based on one or more transactions or events) and output an alert or message if the first information does not match the second information or if some other condition for outputting the alert or message based on a consideration of the first information and the second information is satisfied. The alert or message may be output, for example, via dealer monitor 458. For example, the processor 484 may receive data from at least one of (i) at least one of the antennas 496*a* and 498*b* located within a player station 456*a*, 456*b* or 456*c* (e.g., an indication of chips placed as wagers), (ii) a shared position antenna 460C, (iii) dealer station antenna 460B, (iv) an electronic shoe 464 (e.g., cards dealt for the game). Based on such received data, the processor 484 (e.g., in accordance with the program 490A) may determine a value of chips expected to be in the RFID-enabled chip tray. The processor may do so, for example, by calculating lost wagers and commission amounts, if any, that should have been collected by the dealer and the payments that should have been paid by the dealer for winning hands at the end of a hand based on wagers made and cards dealt. The processor may then be programmed to compare this value of chips expected to be in the tray to the value of chips actually in the tray (e.g., based on data received form chip tray antenna 460A). In some embodiments, an RFID-enabled chip tray of a table system may comprise an additional processor, which may be operable to communicate data to/from processor 484 and/or a processor of another device (e.g., a server device operable to track and manage inventory or data (and provide alerts or messages based thereon) of more than chip tray). In accordance with some embodiments, the expected value of a chip tray balance may be calculated as:

(Opening balance)+(table fill transactions)−(table credit transactions)−(player buy-in transactions)+/−(table win/loss)=Expected balance On a traditional table which does not include the functionalities described herein, a table win/loss may only be estimated and not all buy-in transactions may be recorded. The opening balance, fills and credits may be documented transactions, but may be based on manual chip counts and thus prone to miscounts. In a conventional table game environment, the expected tray balance equation is manually tracked throughout the day and, if a variance is detected, it is common practice for an input to be adjusted. For example, table staff identifies that the table is $1,000 short. A player rating may be adjusted to reflect an additional $1,000 in player win, or an additional buy in transaction for $1,000 may be recorded; both options mask the missing $1,000 and this may happen many times a day on a single table. The reason for the variance may be an incorrect payer rating or a missed buy-in but may also be due to dealer error, player theft or other fraudulent activity. To protect against large losses due to missing chips, operators require that large denomination chips be separately tracked and accounted for.

This procedure does not protect against the loss of many smaller denomination chips that can be easily masked with rating and buy-in adjustments. It can take hours or days to identify and verify that chips are missing. If a variance is not corrected during the day, it may be found on the following gaming day when the table's closing balance is compared to its opening balance and the table's win/loss for the day. If a variance is found, additional research may be done to audit the table as well as pull surveillance video and manually review the entire table operation in an attempt to find a dealer error, a fraudulent transaction or theft. Fraud investigations are time consuming and labor intensive and can span several days. It takes many hours of tape review and investigation to find out why a chip tray was out of balance if it can be determined at all.

An automated RFID-enabled table such as illustrated in FIG. 2, FIG. 3 and/or FIG. 4 may render a dealer's tasks and record keeping associated with game play at the table much more efficient and less prone to error or fraud and allow for tray variances to be identified (and staff to be appropriately alerted) close to the time at which the cause of the variance occurred (e.g., right after a hand in which a commission wasn't correctly collected or a player was overpaid). This allows a wagering establishment to more accurately identify the cause of the variance and thus provides opportunities to more efficiently rectify such variances in a timely fashion. For example, as described herein and according to some embodiments, RFID sensors such as antennas or interrogators may be deployed in a gaming table for the purposes of (i) determining a wager amount associated with a player position; (ii) determine a wager type associated with the wager amount and/or player position; and (iii) transmit an indication of the wager amount and wager type to a table computer for output at a dealer output device. In accordance with some embodiments, the table computer may operate to receive (or otherwise determine) a game result and, based on: the wager type; wager amount; and game result, output a payout instruction via the dealer output device. According to some embodiments, chips placed on the gaming table may be periodically (e.g. once every 0.5 seconds) interrogated by the RFID sensors in order to determine an initial wager amount and to determine any fluctuation in the initial wager amount during a period of time during which such fluctuations are not otherwise permitted (e.g. during the course of a hand of baccarat). If such a fluctuation is determined (e.g. a player surreptitiously adds to his wager after cards have been dealt), the RFID sensors may detect this and output a corresponding message via the dealer output device. Alternatively, or in addition a reporting signal may be transmitted to one or more centralized casino server systems to form a basis for casino personnel action.

In some embodiments, the RFID sensors may be employed in order to ensure that the dealer is indeed (a) awarding payouts to players (associated with a given player position and/or RFID sensor) that are accurate; (b) taking down or collecting any losing bets in their entirety; and/or (c) awarding payouts and/or collecting losing wagers in accordance with a desired and orderly process, protocol or order. In some embodiments, the integration of a card reading shoe and the capture of bet data via RFID sensors such as interrogators or antennas may allow for the detection of overpays, underpays, other errors and cheating as the system tracks and records game outcomes and how each hand was bet. Anomalies detected based on such data may be communicated (or otherwise indicated) to dealers (e.g. with displays embedded in the table) and/or to supervisors, surveillance and management through a computer or other device including e.g. desktop computers, laptops, tablets and smartphone.

In accordance with some embodiments, an RFID-enabled table system which includes an RFID-enabled chip tray allows for inventory updates which are fast and accurate: (i) automated and on-demand scans are complete in seconds; (ii) user prompts ensure that scans are completed correctly and accurately; and (iii) time spent on manual chip counts is eliminated or significantly minimized. Additionally, table inventory information may be displayed and updated after every chip tray transaction: (i) inventory may be displayed and filtered by chip set, denomination and tray location; and (ii) table win/loss, expected float value, actual float value and variance from the expected total are updated in real time throughout the day. Tray errors and chip theft may be detected as soon as they occur: (i) the tray inventory is audited for accuracy after every update allowing immediate and actionable knowledge of tray variances instead of at the end of a shoe, shift or day; and (ii) time consuming and labor intensive investigations and tape reviews may be avoided. In some embodiments, detailed alerts are generated any time a variance is detected:

(i) alerts may be generated any time a table system or table game server detects that a chip has left the tray outside of a correct pay, change, buy-in or credit transaction; (ii) inventory checks can be context-specific so an operator known when and usually how a variance occurred because scans are logged by time and type per game, per credit or fill transaction or as an on-demand inventory scan; and (iii) alerts include details such as "missing losing chip from Player Position 6" and the exact amount missing from the tray.

Figure 5A:
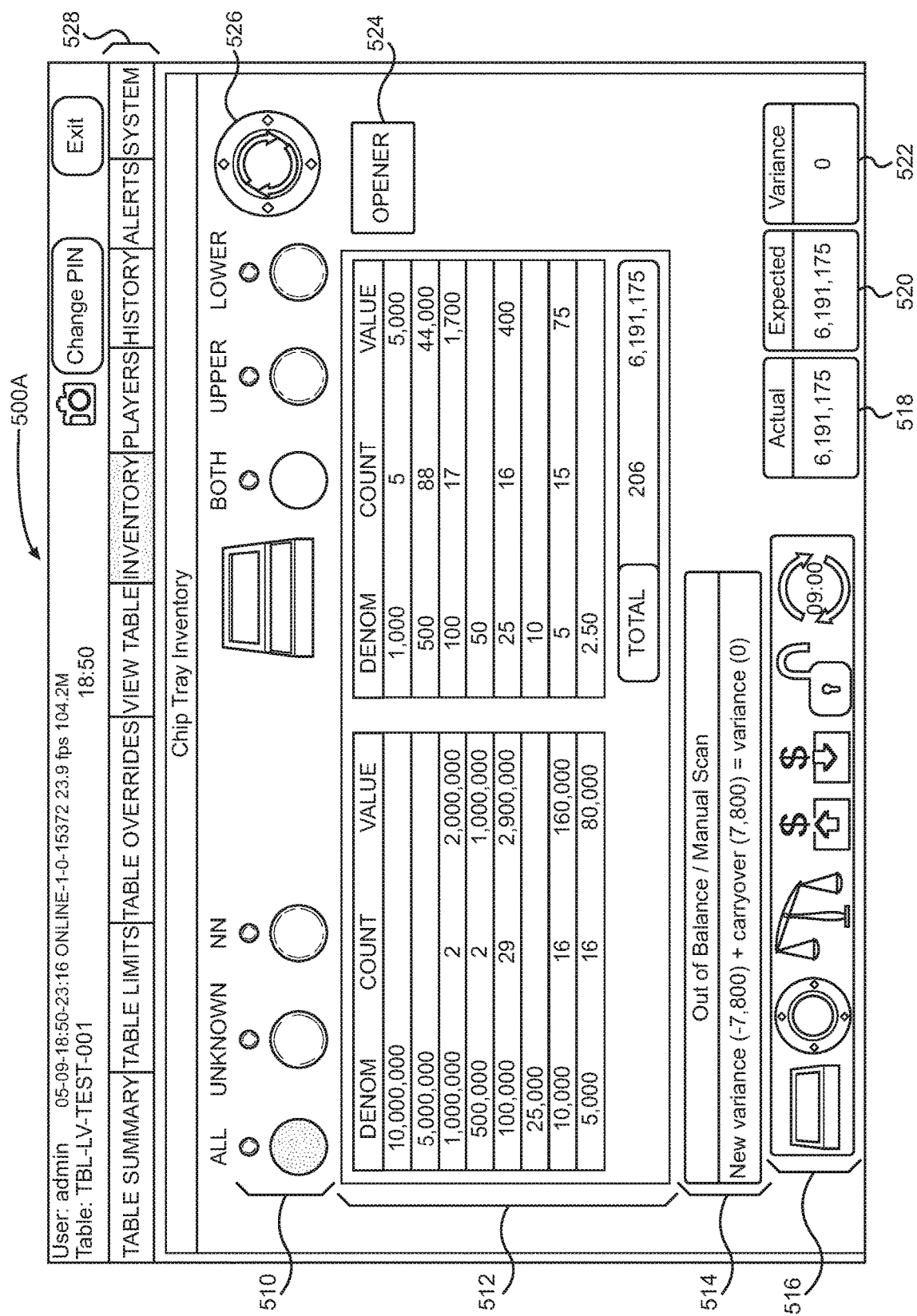
FIG. 5A illustrates an example user interface which outputs information regarding a chip inventory of an RFID-enabled chip tray.

Turning now to FIG. 5A, illustrated therein is a user interface 500A, which may comprise a user interface output to personnel (e.g., a dealer, supervisor or administrator of a wagering establishment) via a display such as display 340 (FIG. 3) or a display remote from a table system (e.g., a display of a computing device in a backroom or office of a wagering establishment, a supervisor station, a display of a table gaming server 110, etc.). The user interface 500A, which may comprise one of several tabs or screens available via a software application which tracks chip tray inventory or other game information for at least one table system such as table system 120 (FIG. 1) or table system 400 (table 4). The user interface 500A may be accessed, for example, by casino personnel periodically, continuously or in response to receiving an alert that a tray variance has been identified. In some embodiments, such software may be operable to track chip tray inventories or other game information for a plurality of table systems. For purposes of the present example, it may be assumed that the user interface 500A is outputting information regarding a single table system chip inventory. The user interface 500A includes various areas via which a user may access information. Area 510, for example, allows a user to select different display filter options. Area 512 outputs, in accordance with some embodiments, chip inventory information by chip set identifier and denomination. Area 514 comprises a user message area via which one or more messages (e.g., regarding a tray variance or lack thereof) may be output to the user.

Area 516 comprises an area which includes various example chip tray status indicators for outputting one or more statuses of the corresponding chip tray. For example: (i) the first icon (from left to right), if highlighted, may indicate that the lid of the chip tray is currently raised; (ii) the second icon, if highlighted, may indicate that an invalid chip has been detected in the chip tray; (iii) the third icon, if highlighted, may indicate that the chip inventory is out of balance (i.e., the actual chip inventory as detected in the tray does not match the expected chip tray inventory); (iv) the fourth icon, if highlighted, may indicate that a credit transaction is in progress at the chip tray; (v) the fifth icon, if highlighted, may indicate that a fill transaction is in progress at the chip tray; (vi) the sixth icon may indicate a lock status of the chip tray (whether the tray is currently locked or unlocked); and (vii) the seventh icon may indicate a time of the last inventory scan of the chip tray. Of course many other statuses and indicators are possible and would be understood by one of ordinary skill in the art upon reading the present disclosure. In accordance with some embodiments, a current status as indicated in area 516 may be maintained until the status is determined to have changed and/or is cleared by authorized casino personnel.

Area 518 indicates an actual tray balance, or the actual value of all chips within the chip tray as determined during the last inventory scan (e.g., using the one or more antennas within the chip tray). Area 520 indicates the expected value of all chips that are expected to be located within the chip tray based on previous transactions and a starting balance e.g., as calculated using a formula such as provided above). Area 522 indicates a tray variance, if any, between the actual value shown in area 518 and the expected value shown in area 520. As can be appreciated from viewing the example data of user interface 500A in area 522 and the "out of balance" indicator in area 516 not being highlighted, the corresponding chip tray does not currently have a tray variance with respect to its chip inventory.

Area 524 comprises a virtual button or link which, if actuated or selected by a user, allows the user to view information regarding the opening inventory of the chip tray. Area 526 comprises a virtual button or link which, if actuated or selected by a user, allows the user to request an on-demand inventory scan of the corresponding chip tray.

Turning now to FIG. 5B, illustrated therein is a user interface 500B which includes the same areas, options and icons as user interface 500A but is displaying data for a tray for which an out of balance status or tray variance has been detected. The out of balance status is indicated by the highlighted icon 530. The magnitude of the tray variance is indicated in area 522, which shows the difference between the actual value of chips in the chip tray and the expected value of chips in the chip tray. Additionally, the message area 514 is outputting an indication of the tray variance determined for the tray. As described herein, such out of balance status and tray variance may be determinable by wagering establishment personnel via a screen such as user interface 500B. In some embodiments, in addition to showing an out of balance status via a user interface such as user interface 500B, the system may generate and output an alert or message to draw a user's attention to the out of balance status (e.g., an audible and/or visual alert, such as a notification which may be output to a user via another interface or mechanism, via a text message or otherwise).

In some embodiments it may be desirable to alert wagering establishment personnel to an out of balance status of a chip tray as it is determined (real time alerts). In some embodiments, such alerts may only be output if the tray variance is greater than a predetermined amount. In some embodiments, a tray variance greater than a predetermined amount may further be accompanied by another event, such as a pause in game play (e.g., a dealer may be prevented from initiating a new hand or dealing new cards until the tray variance is addressed or over-ridden). In some embodiments, a proactive alert may not be output upon a determination of an out of balance status of a chip tray. Rather, the out of balance status may be determinable by a user once the user accesses the appropriate user interface, such as that illustrated in FIG. 5B. For example, in some wagering establishments some casino personnel may be tasked with periodically reviewing the current status of a chip tray to determine whether any tray variances have been detected but the game play is not interrupted upon such tray variances being detected and users are not proactively prompted to view information about such tray variances.

Figure 6:
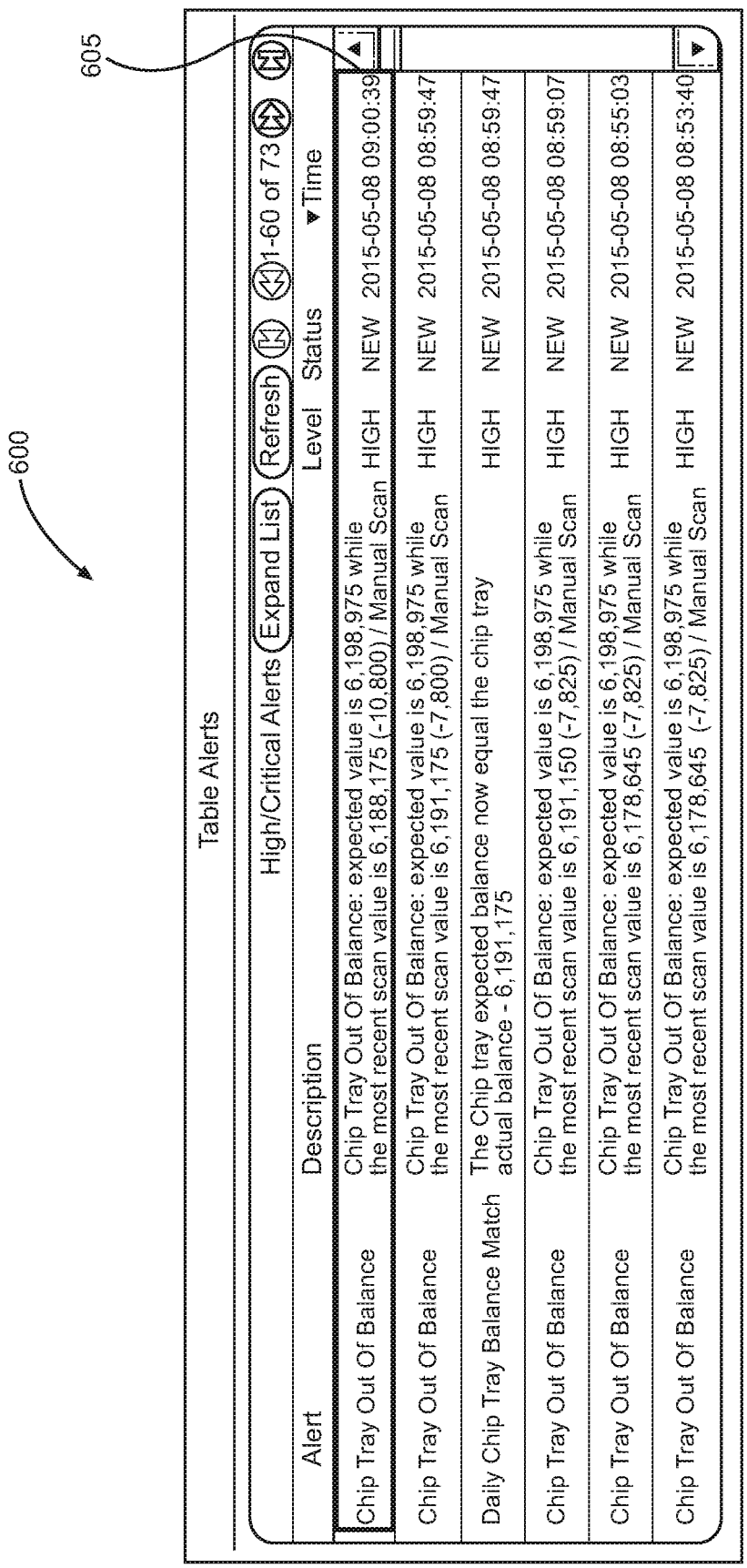
FIG. 6 illustrates an example user interface for outputting alerts or notifications to a user, in accordance with some embodiments described herein.

Turning now to FIG. 6, illustrated therein is another example user interface 600, which illustrates one embodiment of how table alerts may be output to a user (e.g., a dealer or other casino personnel). The user interface 600 may be another screen accessible via a table system software application which also outputs the user interface of FIGS. 5A and 5B. In some embodiments, the user alert messages such as those shown in FIG. 6 may be utilized to track and store a history of chip tray alerts or out of balance statuses, such that an analysis may be performed on how often a chip tray has a tray variance (e.g., this may be correlated to which dealer was dealing at the table and utilized to infer additional information). The alert messages illustrated in FIG. 6 are in chronological order from most recent to least recent (although they can be re-ordered as desired), to allow wagering establishment personnel to determine a history of tray variances and when they were detected. As indicated in the most recent alert 605, the corresponding tray is currently out of balance and has a tray variance of −10,800, which has increased by 3,000 since the immediately previous detected tray variance. In accordance with some embodiments, each alert may be associated with a particular status (e.g., high, medium, low). A status of an alert may be based on, for example, (i) a magnitude of the variance; and/or (ii) a duration of time during which the tray has been out of balance. In some embodiments, different events may be triggered in the system based on a status of an alert. For example, a high alert may trigger a text or e-mail message to be output to designated personnel and/or an interruption in game play on the table at which the chip tray is located while a low or medium level alert may not.

In some embodiments, a message or alert relating to a tray variance or out of balance status of a chip tray may include information regarding the particular RFID-enabled chips which are missing from the tray (i.e., are expected to be in the tray but have not been detected as being located in the tray during the latest inventory scan of chips in the tray). For example, a log of alerts or messages indicative of a tray variance (e.g., such as illustrated in FIG. 6) may indicate, for each chip determined to be missing from the tray, at least one of (i) a unique identifier of the chip; (ii) a chipset identifier; (iii) a category, type or characteristic of the chip (e.g., whether it is a promotional chip); (iv) a denomination of the chip; (v) a value of the chip; and (vi) a player and/or player position associated with the chip. For example, a message indicating the out of balance status of the chip tray due to one or more missing chips may include some information about the missing chips such as: "Missing losers on P5(1, 000)(1×1,000 CASH)." This message may include various data in shorthand form: (i) that the out of balance status is being attributed to non-collection (or non-placement in the tray after collection) by the dealer of a losing wager from player P5 (or player position 5, depending on the embodiment); (ii) that the value of the missing chips is 1,000; (iii) that the 1,000 in value is attributable to a single missing chip; and (iv) that the type of chip that is missing is a CASH chip (e.g., a chip that is redeemable for case, not a promotional or other type of chip). Including such information about the particular chips that are missing may be determinable by the table system (e.g., the processor 484 working in accordance with the program 490A of table system 400 of FIG. 4) based on (i) chip data received from antennas at one or more of the player stations 456 and/or the shared position antenna 460C (any of the foregoing antennas being operable to read and transmit to a processor chip data of chips placed as wagers within a vicinity); (ii) an electronic card shoe (e.g., shoe 464 of table system 400); (iii) information regarding events in the game as input by the dealer (e.g., using a dealer display such as display 322 or 340 of FIG. 3 or dealer display 458 of FIG. 4); (iv) information associated with particular chips in a memory or database (E.g., such as chip status database 490B of FIG. 4); and (v) chip data received from the antenna(s) within an RFID-enabled chip tray (e.g., antenna(s) 460A of FIG. 4). Having more detailed information about the particular chips that are missing (e.g., one or more of the denomination of chip, which player position it should have been collected from, unique chip identifier, chip set identifier, etc.) may help a dealer or other casino personnel identify the chip on the table and/or rectify the out of balance status of a chip tray.

Thus, as described herein, a table gaming system which includes one or more table systems equipped with an RFID-enabled chip tray allows for tracking a table's chip tray inventory in real time (e.g., including the count and total value of chips by casino chip set, denomination, tray location, table position location), comparing an actual value of chips in the chip tray to an expected value of chips and generating an alert or other indication when a tray variance is detected. Such real time tracking of chip tray inventory (e.g., upon each transaction at the table or close to a transaction during the execution of which a tray variance may have been caused) allows for more accurate and efficient identification of chip tray inventory errors and allows such errors to be more likely to be rectified in a timely and satisfactory manner.

In accordance with some embodiments, a table system for facilitating a card game provides for: (i) determining an actual value of RFID-enabled chips located within an RFID-enabled chip tray; (ii) determining an expected value of RFID-enabled chips that should be located within the RFID-enabled chip tray; and (iii) generating an alert if the actual value is not equal to the expected value. In some embodiments, the expected value may be determined based on at least one of an opening inventory of the chip tray, one or more intervening fill transactions, one or more intervening table credit transactions, one or more intervening player buy-in transaction, any intervening commissions paid and any intervening losing and winning wagers (intervening may comprise a transaction which has occurred since the opening inventory was determined or since the last actual inventory was determined). In some embodiments, such an alert may include an indication of the last transaction(s) which have occurred at the table which may have been a cause of the difference between the actual value and the expected value. In one embodiment, the determination that the actual value is not equal to the expected value may cause additional events to be initiated, such as, for example: (i) interruption in game play at the table (e.g., a dealer may be prevented from initiating a new hand or dealing cards from an electronic shoe); (ii) a storage or review of video footage of the table which was taken immediately prior to the determination of the tray variance, and (iii) a selection and/or storage of data from one or more memories (e.g., which may be helpful in determining a cause of the tray variance), such as wagering activity data for wagers which were placed, lost and/or paid during a time immediately preceding the determined tray variance.

Figure 7:
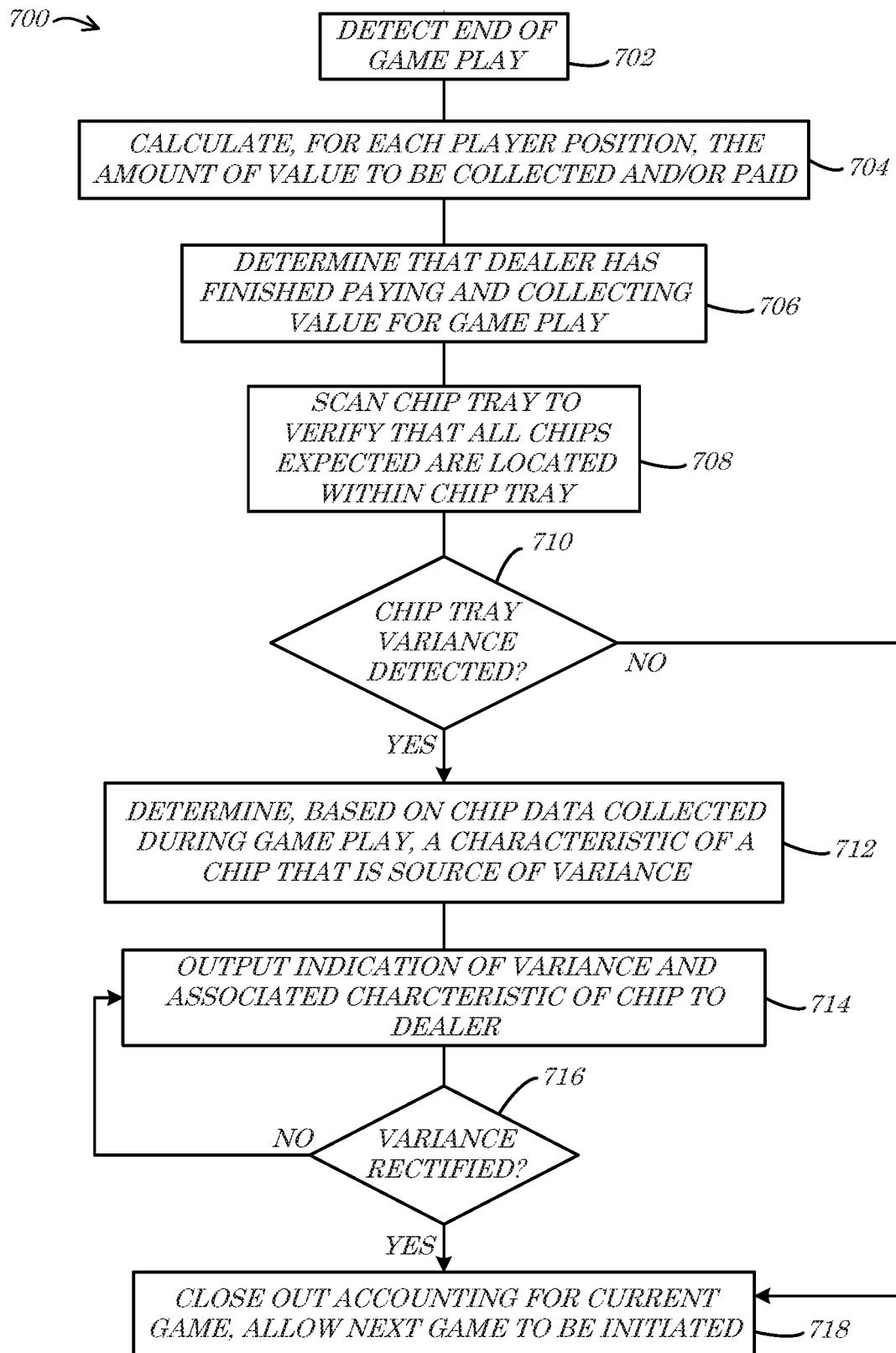
FIG. 7 illustrates a flowchart of an example process consistent with some embodiments described herein.
Figure 8:
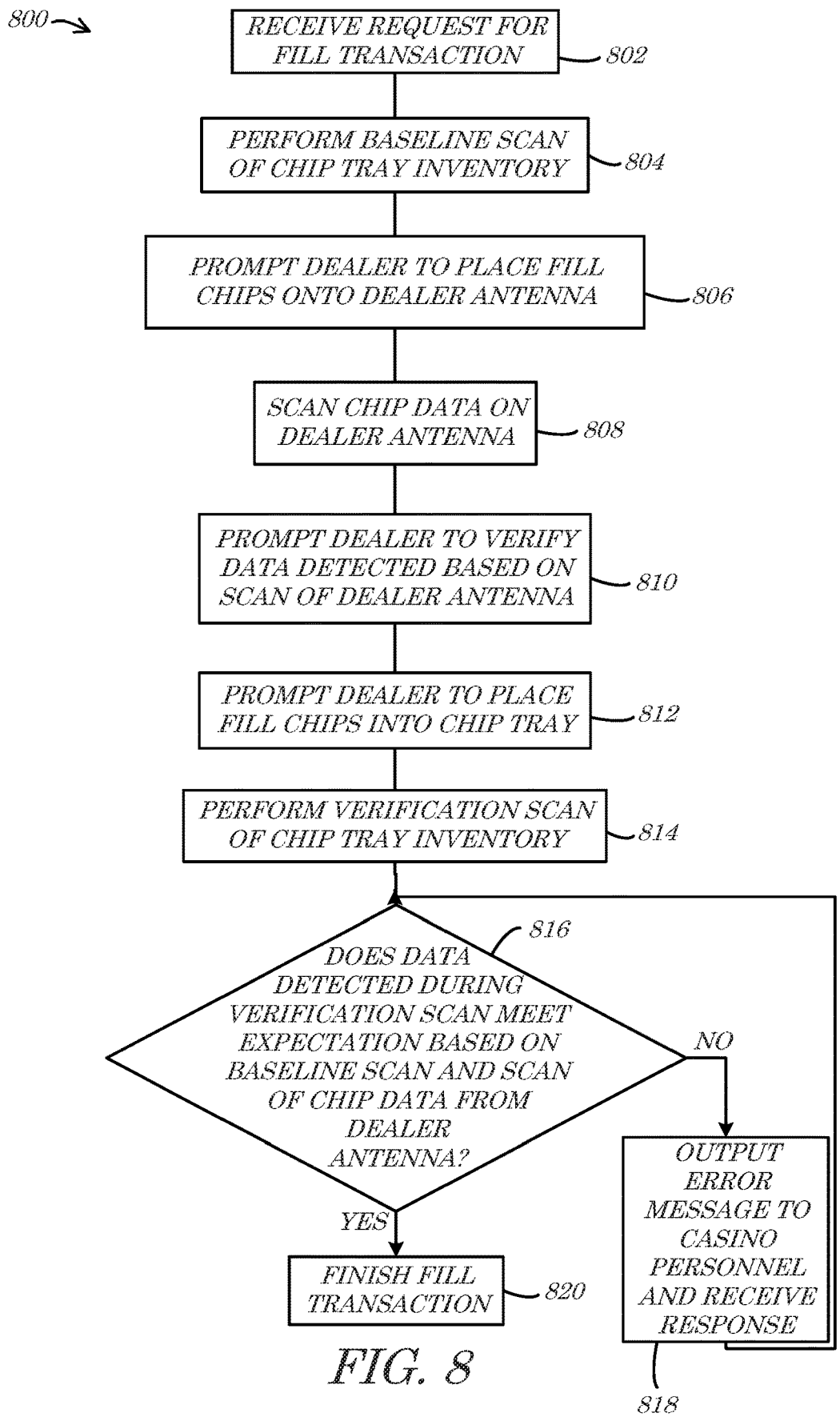
FIG. 8 illustrates a flowchart of an example process consistent with some embodiments described herein.
Figure 9:
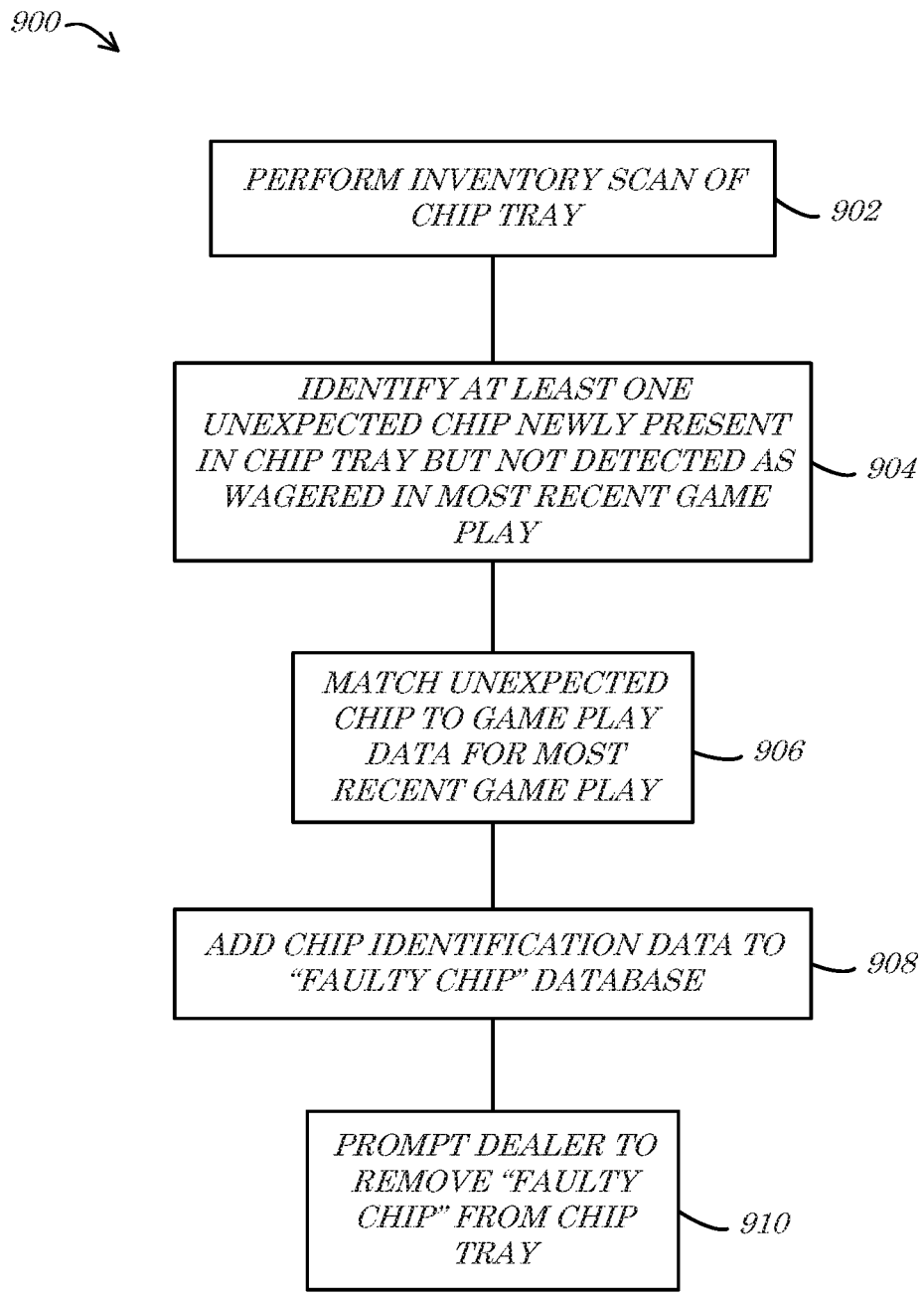
FIG. 9 illustrates a flowchart of an example process consistent with some embodiments described herein.

Referring now to FIGS. 7, 8 and 9, illustrated therein are flow diagrams respective computerized processing methods 700, 800 and 900, which are each consistent with some embodiments described herein. Any or all of the methods 700, 800 and 900, in accordance with some embodiments, may comprise transfer, transmittal, passing, exchanging, and/or providing of data between one or more components of a table system (e.g., a table system 400 of FIG. 4) and/or between one or more components of a table system and a table system server (E.g., between a table system 120 and table game server 110 of FIG. 1). It should be noted that additional and/or different steps may be added to those depicted and that not all steps depicted are necessary to any embodiment described herein. The processes 700, 800 and 900 are example processes of how some embodiments described herein may be implemented, and should not be taken in a limiting fashion. A person of ordinary skill in the art, upon contemplation of the embodiments described herein, may make various modifications to either of the processes 700, 800 and 900 without departing from the spirit and scope of the embodiments in the possession of applicant.

Referring now to FIG. 7 in particular, process 700 begins when an end of game play is detected (702). For example, an input from a dealer or other casino personnel (e.g., via display 340 as illustrated in FIG. 3) may comprise a signal to the system that game play for a current game event has ended. In other embodiments, the determination of an end of game play may be a more automated process, wherein the system determines that game play has ended based on data received from one or more components of a table system (e.g., a final card for the hand being dealt from a card shoe, such as card shoe 360 (FIG. 3) or card shoe 464 (FIG. 4)). An end of game play, for purposes of the process 700, may comprise a status of game play in which the results of the game play (e.g., the results of each participating player's wager) can be determined based on wagers placed and game indicia or outcomes (e.g., all cards in a card game to form each player's, and the dealer's hand if applicable, have been dealt).

Based on the wager and game outcome information available to the system, the system calculates the amount of value to be collected and paid by the dealer for each wager (704). For example, the system may call up the wager data received from each player position antenna to determine the value of each wager placed (and what the wagers was for, such as Player or Banker for a baccarat game), call up the data for outcomes of the game (e.g., cards dealt for the game, which may be automatically determined from an electronic shoe, optical recognition of cards, recognition of RFID data embedded in cards, or input from a dealer) and, based on the programmed rules of the game, determine which wagers are winning wagers and which are losing wagers. The system may then be able to sum how much value the dealer is supposed to collect from each participating player position (whether it be a lost wager or commission) and how much value the dealer is supposed to pay out to each participating player position. In some embodiments, the system may also have the unique chip identifier for each chip to be collected from each participating player position.

It is next determined (706) that all monetary transactions corresponding to the wagers have been resolved or should have been resolved (e.g., dealer has finished collecting all lost wagers and commissions for winning wagers, paid out winnings for winning wagers, finalized any credit or buy-in transactions for the game play, etc.), such that accounting for the current game play should be verified and closed out if possible. In one embodiment, this determination is based on a continuous assessment of the state of the table system. For example, of the status of the current game event (e.g., hand) is that all the cards have been dealt and the dealer has proceeded with collecting the lost wagers and commissions and providing the payouts, the system may invoke logic or assessment for each movement of a wagering chip at the table (e.g., to/from a player position antenna, to/from the chip tray) to determine what state the game is in and whether all bets have been taken and paid. If the system determines that the dealer appears to have finished collecting and paying on all wagers for the game event, it determines that it is ready to proceed to a new state: an end of game chip tray inventory scan.

In 708, the at least one antenna in the chip tray is then directed to perform an inventory scan to identify the current contents of the chip tray (e.g., to determine the total value of chips in the chip tray and/or detect identifiers of each individual chip detected in the chip tray or other characteristics of each chip, such as denomination or chip set identifier). In one embodiment, a processor of a table system may direct the chip tray antenna(s) directly while in other embodiments the chip tray may have its own processor to communicate with the chip tray antenna(s) and relay instructions from the table system processor.

The results of this inventory scan are then compared (in 710) to what the system expected to find in the chip tray and the system determines whether there is any variance or out of balance status for the chip tray. For example, the system may call up the specific chips or chip value that was in the chip tray during the inventory scan that immediately preceded the current inventory scan, as well as the data defining the results of the current game play, to determine what the total value of the chips in the chip tray should be based on payouts that should have been made by the dealer and lost wagers and commissions that should have been collected by the dealer for the current game event (vis-à-vis the inventory of the chip tray prior to these payouts and collections being made). It may then compare the expected inventory data to the actual inventory data determined via the inventory scan of 708. If the two data (expected inventory and actual inventory) match, the process may proceed to close out the accounting for the current game event and thus allow the next game event to be initiated (718). If there is a variance such that the two data do not match, the system may proceed to try and identify the source(s) of the variance and alert the dealer or other casino personnel such that the variance may be corrected in a timely and efficient manner (e.g., prior to players participating in the current game event leaving the table).

Determining that there is a variance in the chip tray balance (or another step in the process 700 or a similar process) may further include, in accordance with some embodiments, a value of the variance (e.g., whether the actual chip tray inventory balance is more than or less than the expected chip tray inventory balance and by how much). In other embodiments, determining that there is a variance (or another step in the process 700 or a similar process) may further comprise identifying particular chip(s) that are missing from the chip tray (or that are unexpectedly detected in the chip tray). In some embodiments, the latter may comprise determining additional detail such as a count, by denomination, chip set identifier or other characteristic, of the missing (or extra) chips. In some embodiments, unique identifiers for specific chips that are missing from (or unexpectedly detected in) the chip tray may also be identified during an analysis of the variance.

If a variance is identified in 710, chip data collected during game play and chip data of the most recent chip tray inventory scan may be called up by the system to help identify the source(s) of the variance, such as at least one characteristic associated with an RFID-enabled chip that is identified as a source of the variance (e.g., a player position from which a missing chip or value of chips should have been collected). Different procedures for identifying the variance may be utilized depending on whether the actual inventory is more than the expected inventory or less than the expected inventory. For example, if it is determined that the actual inventory is less than the expected inventory (i.e., at least one RFID-enabled chip is missing from the chip tray or not being read in the inventory scan), the system may, in accordance with some embodiments, proceed to try to identify the source(s) of the variance by first comparing the missing value to value of chips that should have been collected from each participating player position for the current game event. For example, a dealer may have omitted to collect the correct amount as a lost wager or as a commission.

In one embodiment, the system may call up the data from each player position antenna on which a wager had been detected (or, in some embodiments, for each player position antenna on which a wager had been lost and should have been collected or for each player position antenna from which a commission should have been collected) for the current game play to identify at least one of (i) the value of the chip(s) wagered on each such antenna; (ii) a denomination of each chip wagered on each such antenna; and (iii) a unique identifier of each chip wagered on each such antenna. The system may then compare the value determined to be missing from the chip tray to the value that should have been collected as a lost wager from each respective player position to determine whether there is a match. The system may perform a similar process to compare values of commissions that should have been collected from each such antenna to determine whether any of respective commission value matches the missing value. The system may also poll one or more player position antennas to determine whether the antenna still detects a chip within its range and may compare the value of any such detected chip (or other characteristic, such as denomination or unique identifier) to the value missing from the chip tray. In embodiments in which the unique identifiers of chips are received and stored for each player position antenna during a game event, the system may also call up the unique chip identifier of each chip that should have been collected by the dealer and compare that to the data from the inventory scan performed in step 708 to verify whether each such chip is now located within the chip tray.

Using any of the above or similar techniques, the system may identify at least one characteristic associated with a chip that may be the source of the variance identified in 710 (e.g., a unique identifier, a denomination, a player position from which the missing value may not have been collected). For example, using at least one of the above or similar techniques the system may determine that there is a—$10 variance in the balance of the chip tray (i.e., the chip tray inventory scan revealed that the chip tray has $10 less in value than it is expected to have) and that there was a $10 wager that should have been collected from player position 3 for the current game play. The system may even verify that this was the only $10 wager placed for the current game play and/or that $10 value in chips is still located at player position 3. In some embodiments, the system may determine a unique identifier of a chip that had been wagered and lost for the current game play but that is not located within the chip tray after the dealer has finished collecting all lost wagers for the current game play.

It should be understood that some types of variances may not have a player position that corresponds thereto. For example, if a dealer illegally or impermissibly removes a chip from a chip tray, this may cause a variance in the chip tray that does not correspond to any particular player position. It should further be understood that in some cases the system may not be able to identify a player position as a source of a variance for other reasons (e.g., a chip is actually in the chip tray but not responding due to a weak signal or damage and is thus not detected by the antenna of the chip tray and thus the chip tray scan appears to show a variance where there is none). Thus, in some scenarios and/or embodiments the system may not be able to (or may not need to) correlate a player position to a variance in the balance of the chip tray. However, as described herein, the system may often be able to identify another characteristic of a chip or value corresponding to a variance. For example, the system may be able to identify at least one of a unique identifier, denomination and/or chip set identifier of a chip corresponding to a variance. For example, if a dealer impermissibly removes a chip from the chip tray but that chip had previously been detected as located in the chip tray (e.g., in a previous inventory scan, which detected the unique identifier, denomination and/or chip set identifier of the chip), the system may be able to call up from memory the characteristic of the chip (e.g., its unique identifier and/or denomination) and utilize this information to try and track down the location of the chip and correct the variance. For example, the unique identifier of the missing chip may be added to a "suspect" chip database, such that if this chip is subsequently detected as in use elsewhere (e.g., a person attempts to cash it out or wager it), casino personnel may be alerted to investigate why a chip missing from a particular chip tray is being used somewhere in the gaming establishment.

Presuming, for purposes of the present example embodiment, that the system is able to identify at least one characteristic of a chip or missing value comprising a variance in the chip tray balance determined in 710, an alert or notification may be output to casino personnel (e.g., a dealer or other casino personnel). The alert or notification may inform the casino personnel of at least one of (i) that a variance was determined in the balance of the chip tray; (ii) the value of the variance; (iii) at least one characteristic associated with a particular chip that has been identified as a possible source of the variance (e.g., a player position from which the chip should have been collected, a denomination of the chip, a unique identifier of the chip and/or a chip set identifier of the chip); and (iv) a count by denomination of the chip(s) that are the source of the variance. In embodiments in which the alert is output to a dealer, it may be output via a dealer display of the table. In embodiments in which the alert is output to other casino personnel (e.g., a shift supervisor or other casino employee other than a dealer), the alert may be output via another display of another device accessible to such personnel.

In accordance with some embodiments, the alert or notification may include an instruction for corrective action to be taken in order to rectify the variance. For example, a dealer may be instructed to collect the appropriate chip(s) or value from a particular player position. In some embodiments, the dealer may be allowed to override the alert or notification and thus "rectify" the variance by indicating to the system that it should log the variance but that no further corrective action will be taken by the dealer. For example, the dealer may be trained to not take corrective action under certain circumstances (e.g., when the table is very busy and the variance value is low) or may recognize that although the system has determined a variance this is due to a faulty chip or other error in the data (e.g., the dealer may know that he did in fact collect the chip(s) that the system thinks are missing from the chip tray).

In accordance with some embodiments, the system may be programmed with different rules for when (or if) an alert or notification based on an identified variance is to be output and/or to whom it is to be output. For example, in some cases an alert or notification of a variance may not be output to a dealer or other casino personnel (or may be output only to other casino personnel but not to the dealer) unless a value of the variance exceeds a predetermined minimum threshold (e.g., if the value of the variance is less than $100USD, the system may log it and it may be included in reports generated by the system, but an alert to a dealer may not be output in real time because a game provider may determine that a variance of this magnitude is insufficient to slow down the initiation of a subsequent game event). In another example, a variance of less than a predetermined amount may cause a notification to be output to a shift supervisor but not to a dealer, and no corrective action may be required by the system. In yet another example, if a value of a variance is more than a first predetermined threshold amount (e.g., $100USD) but less than a second predetermined threshold amount (e.g., $1000USD), an alert or indication may be output to both a dealer and other casino personnel but no corrective action may be required, however if the value of the variance is at least equal to the second predetermined threshold then corrective action may be required prior to another game event being allowed. In some embodiments, different priorities or different levels may be assigned to different variances (e.g., based on a value of a variance) and only variances of certain levels may be output as alerts or notifications provided in real time to dealers or other casino personnel. FIG. 6 illustrates how a level of an alert may be output in a report of alerts to casino personnel. It should be understood that the particular threshold amounts in the above examples are not intended to be limiting, any desirable threshold amounts may be utilized.

In 716 it is determined whether the variance has been rectified. This may comprise a re-scanning of the chip tray to determine whether the actual inventory does now match the expected inventory (e.g. to determine whether any missing chips have not been added to the chip tray). In some embodiments this may comprise determining that an override or other input has been received from a dealer or other authorized casino personnel. In the latter embodiment, the system may be programmed to log the variance in an accounting of the game event and close out the current game event activity. In some embodiments, a manually requested scan of the chip tray inventory may be initiated by casino personnel once the casino personnel believes the variance has been rectified (e.g., a dealer may provide an appropriate input once he collects the missing chip(s), as instructed). If it is determined in 716 that the variance has not been rectified, then the process 700 may, in some embodiments, return to 714 and the alert or notification may again be output. In some embodiments, a second alert or notification may be output to a different casino personnel than the first alert or notification (e.g., a shift supervisor may be alerted if only the dealer had previously been alerted). In some embodiments, if the value of the variance does not exceed a predetermined threshold amount, the process may proceed to step 718 if, after a predetermined amount of time has passed since the first alert was output in step 714 even if the variance has not yet been rectified (e.g., for sufficiently small variances, a casino or other game provider may not want to further slow down a game even if the variance has not been corrected). Once it is determined that the variance has been rectified (or, in some embodiments, that it is not necessary to rectify the variance prior to proceeding to a new game state), the process may proceed to 718.

In 718 the accounting for the current game may be finalized or closed out. Thus, a final status of inventory in the chip tray may be logged, any outstanding variances may be logged and the status of the system may be allowed to proceed to a state in which data for a new game event may begin to be collected and tracked.

Turning now to FIG. 8, illustrated therein is a process 800 which may, in accordance with some embodiments, be utilized for Fill transactions (in which RFID-enabled chips are added to a chip tray so that the dealer has sufficient chips for facilitating games, buy-ins, etc.). In some embodiments, a Fill transaction may be performed in response to a dealer or other casino personnel (e.g., a supervisor) selecting this type of transaction from a menu of available options provided via a GUI on a dealer or other display (e.g., via an interface output on display 322 or display 340 (FIG. 3)).

Once a request for a fill transaction is received (802), a baseline scan of chip tray inventory may be performed (804), such as by chip tray antenna 460A (FIG. 4). For example, the antenna(s) of a chip tray may be directed to perform a scan of RFID chips within the tray to identify the total value of chips in the chip tray prior to the chip transaction. In some embodiments, the inventory scan may also include obtaining more detailed data on the individual chips located within the chip tray (e.g., unique identifier of each chip and/or a count, by denomination, of the chips in the chip tray). Once the baseline scan of the chip tray inventory is completed, the process proceeds to 806, wherein the dealer or other casino personnel may be prompted (e.g., via dealer display 458 (FIG. 4)) to output to place all the RFID-enabled chips that comprise the Fill transaction onto the dealer area of the table surface such that they may be interrogated by the dealer station antenna 460B (FIG. 4).

The RFID-enabled chips placed within range of the dealer station antenna are then scanned or read in order to determine the total value of the chips (808). In some embodiments, additional detailed data may also be read from each of the chips (e.g., unique chip identifier, chip denomination, chip set identifier, etc.). In accordance with some embodiments, the dealer may be prompted (e.g., via dealer display 458 (FIG. 4)) to input or verify the total value of chips comprising the Fill transaction (810). In some embodiments, the value input or verified by the player may be compared to the value determined based on the scan of the chips within range of the dealer station antenna. If the two values do not match, an alert may be output to the dealer and/or other casino personnel and corrective action may be required (e.g., the chips on the dealer station antenna may be rescanned, the dealer may be asked to again verify the expected value of the chips, a supervisor may be alerted). In some embodiments, a second casino employee besides a dealer may be involved in a Fill transaction and this second employee may be prompted to input information (e.g., a value of chips comprising the Fill transaction, an authorization code, etc.) during the Fill transaction.

The dealer is then prompted (e.g., via dealer display 458 (FIG. 4)) to place the chips comprising the Fill transaction into the chip tray (812). A second scan of the chip tray inventory is then performed (e.g., by the chip tray antenna 460A) at 814. The results of the second scan are compare to the results of the baseline scan performed at 804. For example, the total value of chips in the chip tray identified in the scan at 804 may be compare to the total value of chips in the chip tray identified in the second scan at 814 may be compared. The difference should be equal to the value of chips detected by the dealer station antenna at 808 and/or received from the dealer at 810.

If it is determined, at 816, that the value of chips that have been added to the chip tray matches the value of the chips detected at the dealer station antenna at 808, the Fill transaction is allowed to be completed (820). If, however, it is determined that the value of the chips added to the chip tray does not equal the value of the chips detected at the dealer station antenna at 808, the process 800 may proceed to 818, wherein an error message or alert is output to casino personnel (e.g., the dealer and/or other casino personnel such as a supervisor). In accordance with some embodiments, an authorized response (e.g., from a supervisor) may be required in the latter scenario before the Fill transaction is allowed to be completed. The process 800 is directed at minimizing or preventing a dealer or other person from attempting to impermissibly remove a chip during a Fill transaction by taking advantage of the RFID capabilities of the table systems described herein.

Turning now to FIG. 9, illustrated therein is a process 900 which may, in accordance with some embodiments, be utilized to recognize and update the status of faulty chips. In accordance with some embodiments, a table system which includes an RFID-enabled chip tray and/or other interrogators or antennas for reading information from RFID-enabled chips placed on the table (e.g., such as illustrated in FIGS. 2-4), may be operable to identify an RFID-enabled chip that is deficient or damaged in some manner (e.g., because the chip emits a weak signal, does not consistently respond to an interrogator excitation signal and/or does not respond with all expected data). For example, if a chip is determined to not be operating according to specification or expectation, it may be beneficial to remove the chip from circulation. For example, the chip may not respond to an interrogation command from an interrogator (e.g., a MARS reader) with the expected data according to the specification of its RFID standard, which can indicate that an electronic component of the chip is damaged. In some embodiments, such a system may still be operable to transmit its unique identifier or some subset of data. In accordance with some embodiments, if the system determines that a chip is damaged, deficient or not performing to specification, it may identify the chip (and, in some embodiments, a current location of the chip on the table or in the chip tray) and output instructions (e.g., via a dealer display or other appropriate user interface) to a dealer or other casino personnel to remove and/or replace the chip.

The example process 900 is performed in the context of an inventory scan of a chip tray (e.g., as may be performed by a chip tray antenna 460A at the end of a game, in response to a manual scan instruction, periodically, during an idle state or otherwise). Once the inventory scan is performed in 902, it may be determined that there is at least one RFID-enabled chip newly identified in the chip tray that was not expected to be there (e.g., it is not a chip that was previously determined as being present in the chip tray during a previous inventory scan or by a player position antenna as having been wagered and lost during a previous game event). Data regarding the chip may be compared to game play data for the most recent game event (906). For example, the system may be programmed to compare the unique chip identifier of the chip against chip identifiers of chips that were or should have been collected during previous game play as lost wagers or commissions. The system may also compare the chip's data against other transaction data (e.g., against chip identifiers of chips that were added to the chip tray during a Fill or other transaction).

If the system is unable to find a source of the unexpectedly detected chip based on a comparison to data from a previous game event or other transactions, the system may infer that the chip is faulty in some manner and was not properly read during previous game play or another transaction. In accordance with some embodiments, the system may thus add the chip to a "Faulty Chip" database or change a status of the chip to indicate that it is faulty (908).

In 910 the dealer (or other casino personnel in some embodiments) may be prompted to remove the chip from circulation if it is determined to be faulty. The information provided to the dealer or other casino personnel may include a location (specific or general) of the chip as well as other information that may allow the chip to be accurately identified. For example, a denomination of the chip as well as exact location in the chip tray or on a player position may be determined and output (the latter may, in some embodiments, be determined based on divide-and-conquer algorithm, in some embodiments in conjunction with whatever minimal data was able to be read from the chip).

In accordance with some embodiments, an RFID-chip may be determined to be deficient, damaged or not operating according to specification if there are repeated indications determined by the system that the chip is not transmitting all data that it is expected to transmit or it is repeatedly determined to be emitting a weak signal. For example, if the same chip (e.g., uniquely identified based on a chip ID or otherwise) is determined to not respond strongly or to not respond with all expected data then the chip may be flagged (e.g., in a chip status database) as faulty and slated for removal from circulation. In some embodiments the repeated attempted reads of the data of the chip (e.g., the chip's responses to interrogation commands from an interrogator such as an antenna on one or more tables) may occur over a course of different game events. For example, the system may be operable to track, for a given RFID-enabled chip, a count of how many times it has responded to an interrogation signal with insufficient data or a weak signal and flag it for removal from circulation once this count exceeds a predetermined threshold, and this tracking may occur over a plurality of different games in which the chip is used and may occur at different tables or in association with different players. In other embodiments, if an RFID-enabled chip responds with a weak signal or data less than what is expected (e.g., does not allow all data for all expected data fields to be read), the system may then continue to attempt to read the data from the chip again and, if it is unable to read all the data after a predetermined number of attempts, it may flag the chip for removal from circulation. and perhaps even on different tables while in other embodiments these may be consecutive repeated attempted reads. In either type of scenario, in some embodiments a status of a chip may be changed (e.g., to "faulty," "damaged" or "weak") in a chip status database based on insufficient data reads being obtained from the chip after a number of repeated attempts. Thus, in such embodiments, step 908 may comprise updating a status of the chip or updating a count of how many times the chip has been determined as potentially faulty and step 910 may only be performed if the count reaches a predetermined threshold.

In accordance with some embodiments, other statuses of a chip and/or a status or progress of game events may be inferred or determined based on location of a chip or movement of a chip from one location to another. As described herein, in some embodiments a table system is operable to track the movement of RFID-enabled chips between player positions and a dealer chip tray. In one embodiment, the movement of the chips in and/or out of the chip tray may be utilized to determine at least one of (i) game winners and losers' (ii) player turnover (total amount wagered) and (iii) win/loss. For example, in one embodiment if particular chips are detected on a player position as having been wagered, these are logged as "chips wagered" (e.g., the status of these chips is set to "wagered" in a chip status database) if those same chips are next detected in the chip tray. In some embodiments, these chips may also be considered "lost" in a wager. In another example, if chips last sighted in an RFID-enabled chip tray are next detected by an antenna of a player position along with wagered chips, that player position may be determined by the table system to be a winner. In this way win/loss may be determined and/or verified in some embodiments. As another example of how movement of chips may be utilized to update a status or progress of a game event an identifier of a player or player position that is currently associated with a particular chip or chip stack may be cleared from a memory or database (or a status of the chip(s) may otherwise be updated to reflect that the chip(s) should no longer be associated with that player or player position identifier) when that chip or chip stack is detected in the chip tray by a chip tray antenna. This may be done, for example, on the presumption that the player who was previously associated with the chip or chip stack lost the chip(s) in a wager and should thus no longer be associated with the chip(s) as a current owner. The tracking of movement of chip(s) in and out of a chip tray may thus allow for various determinations that may be useful in calculating or inferring information such as exact table win/loss or more accurate theoretical win/loss in real time.

A process similar to the process of FIG. 9 may be utilized to automatically enroll or add newly recognized chips to a database of chips that are being tracked or that are considered authorized for circulation or use in a given game or within a given location. For example, if the system detects an RFID-enabled chip (e.g., on a player position or in a chip tray) that is not included in a database of chips that are being tracked or are considered authorized for circulation or use, the system may include logic that compares the data read from a given RFID-enable gaming chip (e.g., the gaming company identifier) to chip data that is included in the database (e.g., with a list of valid identifiers in a memory or database if valid gaming company identifiers). If the data read from the chip (e.g., gaming company identifier) matches data in the database but other data or parameters of the chip (e.g., chip set identifier and casino site identifier) are not in the database, then the system may automatically add this information to the database as well. For example, the system may generate a new record in a chip status or other database for the newly recognized chip. This may facilitate the system accepting new chips and recognizing them as valid as long as the casino has approved the gaming company identifier associated with the chip.

Rules of Interpretation & General Definitions

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, Local Area Network (LAN), Wide Area Network (WAN), or Ethernet (or IEEE 802.3), Token Ring, or via any appropriate communications means or combination of communications means. Exemplary protocols include but are not limited to: BLUETOOTH™, TDMA, CDMA, GSM, EDGE, GPRS, WCDMA, AMPS, D-AMPS, IEEE 802.11 (WI-FI), IEEE 802.3, SAP, SAS™ by IGT, SUPERSAS™ OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cellular networks, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. An RFID-enabled table system for facilitating a game, comprising:
    a dealer antenna corresponding to a dealer area of a table surface and operable to detect data relating to an RFID-enabled gaming element placed within the dealer area;
    a plurality of player position antennas, each of the player position antennas corresponding to a respective player area of a table surface and operable to detect data relating to an RFID-enabled gaming element placed within the respective player area;
    a gaming element container antenna operable to detect data relating to a gaming element placed within the container;
    a display device;
    a processor; and
    a memory storing a program for directing the processor, the processor being operable with the memory to:
        direct the game element container antenna to perform an inventory scan to determine first data defining RFID-enabled game elements located within the game element container, thereby receiving current inventory data;
        identify, based on the current inventory data, at least one RFID-enabled game element that was not detected by at least one player position antenna during a most recent game event and that was not previously detected by the game element container antenna in a most recent previous scan of contents of the game element container, thereby identifying at least one unexpected RFID-enabled game element;
        determine second data, the second data corresponding to the at least one unexpected RFID-enabled game element;
        match the second data to third data defining the most recent game event; and
        change a status of the at least one unexpected RFID-enabled game element to indicate that it is faulty.

2. The RFID-enabled system of claim 1, wherein the processor is further operable with the program to:
    output an instruction to casino personnel to remove the at least one unexpected RFID-enabled game element from the game element container.

3. The RFID-enabled system of claim 2, wherein the instruction includes, for the at least one unexpected RFID-enabled game element, at least one of (i) a location in the chip tray; and (ii) a denomination.

4. The RFID-enabled system of claim 2, wherein the processor being operable with the program to change the status of the at least one unexpected RFID-enabled game element comprises the processor being operable with the program to change the status as it is stored in a database of game elements available for game play.

5. The RFID-enabled system of claim 1, wherein the processor is further operable with the program to:
    determine, based on previous interrogations of the at least one RFID-enabled game element, whether the at least one unexpected RFID-enabled game element responded with all expected data; and
    only changing the status of the at least one unexpected RFID-enabled game element to indicate that it is faulty if the at least one unexpected RFID-enabled game element is determined to have failed to respond with all expected data in a minimum predetermined number of interrogations.

6. The RFID-enabled system of claim 5, wherein the minimum predetermined number of interrogations is one.

7. The RFID-enabled system of claim 5, wherein the processor is further operable with the program to:
   changing the status of the at least one unexpected RFID-enabled game element to indicate that it is potentially faulty if the at least one unexpected RFID-enabled game element is determined to have failed to respond with all expected data in less than the minimum predetermined number of interrogations.

8. The RFID-enabled system of claim 1, wherein the processor is further operable with the program to:
   determine that the at least one unexpected RFID-enabled game element is responding to an interrogation with a weak signal; and
   only changing the status of the at least one unexpected RFID-enabled game element to indicate that it is faulty if it is determined that the at least one RFID-enabled game element has responded to the interrogation with the weak signal in in a minimum predetermined number of interrogations.

9. The RFID-enabled system of claim 8, wherein the minimum predetermined number of interrogations is one.

10. The RFID-enabled system of claim 8, wherein the processor is further operable with the program to:
    changing the status of the at least one unexpected RFID-enabled game element to indicate that it is potentially faulty if the at least one unexpected RFID-enabled game element responds to the interrogation with the weak signal in less than the minimum predetermined number of interrogations.

* * * * *